US012784593B2

(12) United States Patent
Zhou et al.

(10) Patent No.: US 12,784,593 B2
(45) Date of Patent: Nov. 3, 2026

(54) METHOD FOR DETERMINING VIRTUAL PARKING SLOT, DISPLAY METHOD, APPARATUS, DEVICE, MEDIUM, AND PROGRAM

(71) Applicant: HUAWEI TECHNOLOGIES CO., LTD., Shenzhen (CN)

(72) Inventors: Lei Zhou, Hangzhou (CN); Jia Cai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 131 days.

(21) Appl. No.: 18/645,689

(22) Filed: Apr. 25, 2024

(65) Prior Publication Data

US 2024/0296737 A1 Sep. 5, 2024

Related U.S. Application Data

(63) Continuation of application No. PCT/CN2022/127434, filed on Oct. 25, 2022.

(30) Foreign Application Priority Data

Oct. 28, 2021 (CN) ......................... 202111266615.5

(51) Int. Cl.
*B60W 50/08* (2020.01)
*B60W 30/06* (2006.01)
(Continued)

(52) U.S. Cl.
CPC ............... *G08G 1/144* (2013.01); *G08G 1/04* (2013.01)

(58) Field of Classification Search
None
See application file for complete search history.

(56) References Cited

U.S. PATENT DOCUMENTS

2017/0043808 A1* 2/2017 Yang .................... B62D 15/021
2018/0099661 A1* 4/2018 Bae ............................ B60R 1/27
2019/0071070 A1 3/2019 Kato et al.

FOREIGN PATENT DOCUMENTS

CN 109138561 A 1/2019
CN 109278744 A 1/2019
(Continued)

*Primary Examiner* — John F Mortell
(74) *Attorney, Agent, or Firm* — WOMBLE BOND DICKINSON (US) LLP

(57) ABSTRACT

This application discloses a method for determining a virtual parking slot, a display method, an apparatus, a device, a medium, and a program, and pertains to the automatic parking field. The method includes: obtaining environment information around a target vehicle, where the target vehicle is a to-be-parked vehicle, and the environment information includes parking information of one or more parked vehicles; determining a reference vehicle based on the parking information of the one or more parked vehicles, where the reference vehicle is one of the one or more parked vehicles; and determining a target virtual parking slot based on parking information of the reference vehicle, where the target virtual parking slot indicates a parking location and a parking direction of the target vehicle. In embodiments of this application, the target virtual parking slot is determined based on a parking direction of the reference vehicle.

20 Claims, 13 Drawing Sheets

(51) Int. Cl.
*G08G 1/04* (2006.01)
*G08G 1/14* (2006.01)

(56) References Cited

FOREIGN PATENT DOCUMENTS

| | | | | |
|---|---|---|---|---|
| CN | 109693666 | A | 4/2019 | |
| CN | 110654375 | A | 1/2020 | |
| CN | 111460851 | A | 7/2020 | |
| CN | 112896151 | A | 6/2021 | |
| EP | 1679526 | A1 | 7/2006 | |
| EP | 4049908 | A1 * | 8/2022 | ......... B62D 15/0285 |
| WO | 2012143033 | A1 | 10/2012 | |

* cited by examiner

METHOD FOR DETERMINING VIRTUAL PARKING SLOT, DISPLAY METHOD, APPARATUS, DEVICE, MEDIUM, AND PROGRAM

CROSS-REFERENCE TO RELATED APPLICATIONS

This application is a continuation of International Application No. PCT/CN2022/127434, filed on Oct. 25, 2022, which claims priority to Chinese Patent Application No. 202111266615.5, filed on Oct. 28, 2021. The disclosures of the aforementioned applications are hereby incorporated by reference in their entireties.

TECHNICAL FIELD

This application relates to the field of automatic parking technologies, and in particular, to a method for determining a virtual parking slot, a display method, an apparatus, a device, a medium, and a program.

BACKGROUND

An automatic parking technology is a technology that automatically parks a vehicle into a parking slot by detecting an actual environment around the vehicle in real time. In a process of parking a vehicle into a parking slot by using the automatic parking technology, a virtual parking slot needs to be determined, so as to implement automatic parking in the virtual parking slot. Therefore, how to determine the virtual parking slot becomes an urgent problem to be resolved currently.

SUMMARY

This application provides a method for determining a virtual parking slot, a display method, an apparatus, a device, a medium, and a program, to determine a virtual parking slot, so as to implement automatic parking. The technical solutions are as follows.

According to a first aspect, a method for determining a virtual parking slot is provided. In the method, environment information around a target vehicle is obtained, where the target vehicle is a to-be-parked vehicle, and the environment information includes parking information of one or more parked vehicles. A reference vehicle is determined based on the parking information of the one or more parked vehicles, where the reference vehicle is one of the one or more parked vehicles. A target virtual parking slot is determined based on parking information of the reference vehicle, where the target virtual parking slot indicates a parking location and a parking direction of the target vehicle.

In the technical solutions provided in this application, one vehicle is selected from the one or more parked vehicles around the target vehicle as the reference vehicle, and the target virtual parking slot is determined based on the parking direction of the reference vehicle. This can ensure that the target vehicle and the selected reference vehicle are arranged in a consistent manner after automatic parking is performed in the virtual parking slot, and improves parking neatness and convenience. The reference vehicle is first determined, and then the target virtual parking slot is determined based on the reference vehicle. To determine the virtual parking slot more quickly and accurately, regardless of whether the reference vehicle is a reference vehicle selected by a user or a reference vehicle determined by a system, a parking location and a parking direction of the reference vehicle are both accurate or optimal. This can improve coordination between the target vehicle and a surrounding environment after parking, and does not lead the target vehicle to improperly affect driving or parking of another vehicle. In addition, this facilitates the user to drive the target vehicle out when the user needs to use the vehicle. The environment information around the target vehicle includes at least one of visual data and radar data, and the radar data includes ultrasonic radar data, laser radar data, and millimeter-wave radar data. In other words, the technical solutions provided in this application are applicable to at least one type of data. This improves an application scope of the technical solutions provided in this application.

In the technical solutions provided in this application, a parked vehicle may be located in a non-marked parking region, for example, a non-marked parking lot, a hotel door, a road, or two sides of an aisle; or may be parked on a marked parking slot, especially when a parked vehicle is not parked in a region indicated by the marked parking slot. This affects that a target vehicle normally parks into an adjacent parking slot corresponding to the parked vehicle based on the marked parking slot.

When data included in the environment information is different, there are a plurality of implementations of obtaining the environment information around the target vehicle. For example, vehicle-mounted surround-view cameras collect an actual environment around the target vehicle, to obtain the visual data around the target vehicle, for example, surround-view images. Sensors such as ultrasonic radar, laser radar and millimeter-wave radar collect the actual environment around the target vehicle, to obtain the radar data around the target vehicle. The method for determining the virtual parking slot provided in this application is described in detail below by using an example in which the environment information around the target vehicle is a surround-view image.

The one or more parked vehicles are parked vehicles around the target vehicle. Therefore, when the environment information around the target vehicle is the surround-view image, the surround-view image includes the parking information of the one or more parked vehicles. The plurality of parked vehicles include two or more parked vehicles.

There are a plurality of manners of determining the reference vehicle based on the parking information of the one or more parked vehicles. The following describes two implementations thereof.

In a first implementation, a first user interface is displayed. The first user interface includes parking locations and parking directions of the one or more parked vehicles, and the parking locations and the parking directions of the one or more parked vehicles are determined based on the parking information of the one or more parked vehicles. A second user interface is displayed in response to a first operation of a user. The second user interface includes the reference vehicle, and the first operation indicates to select the reference vehicle from the one or more parked vehicles.

In other words, after the first user interface is displayed, the user triggers the first operation on the first user interface. When detecting the first operation of the user, the electronic device displays the second user interface in response to the first operation of the user. In this case, the second user interface includes the reference vehicle. In this way, the reference vehicle can be determined from the one or more parked vehicles.

Because the parking locations and the parking directions of the one or more parked vehicles around the target vehicle are displayed on the first user interface, the user can learn of the environment information around the target vehicle on the first user interface, and can select the reference vehicle from the one or more parked vehicles with reference to the environment information around the target vehicle. The reference vehicle finally selected by the user meets an actual requirement of the user. This meets a personalized requirement of the user.

There are a plurality of forms of the first user interface. When the forms of the first user interface are different, manners in which the user selects the reference vehicle on the first user interface are also different. The following separately describes the manners.

In some embodiments, a surround-view image around the target vehicle and a vehicle selection region are displayed on the first user interface. The vehicle selection region includes one or more operation identifiers, and the one or more operation identifiers one-to-one correspond to the one or more parked vehicles. When detecting the first operation performed by the user on any one of the one or more operation identifiers, the electronic device displays the second user interface in response to the first operation of the user.

In other words, after the surround-view image around the target vehicle and the vehicle selection region are displayed on the first user interface, the user triggers the first operation on the any one of the one or more operation identifiers included in the vehicle selection region. In this case, a parked vehicle corresponding to the any operation identifier is determined as the reference vehicle, and the second user interface is displayed.

Because the surround-view image around the target vehicle is a real environment image, the surround-view image around the target vehicle is displayed on the first user interface, so that the user can more intuitively learn of the environment information around the target vehicle.

In an example, the surround-view image further includes the target vehicle. In an embodiment, the first user interface further includes an icon indicating the target vehicle. In this way, when the user selects the reference vehicle from the one or more parked vehicles, a reference can be provided for the user, so that the user distinguishes between the target vehicle and the parked vehicle. Similarly, the second user interface may also include the target vehicle, and the second user interface may further include the icon indicating the target vehicle.

It should be noted that the surround-view image is a two-dimensional surround-view image or a three-dimensional surround-view image.

In some other embodiments, parking locations and parking directions of the one or more parked vehicles are determined based on the parking information of the one or more parked vehicles, and one or more virtual vehicle models are displayed on the first user interface based on the parking locations and the parking directions of the one or more parked vehicles. The one or more virtual vehicle models one-to-one correspond to the one or more parked vehicles. When detecting a first operation performed by a user on any one of the one or more virtual vehicle models, the electronic device displays a second user interface in response to the first operation of the user.

In other words, after the one or more virtual vehicle models are displayed on the first user interface, the user triggers the first operation on the any one of the one or more virtual vehicle models. In this case, a parked vehicle corresponding to the any one virtual vehicle model is determined as the reference vehicle, and a second user interface is displayed.

When the one or more virtual vehicle models are displayed on the first user interface, the user can directly operate a virtual vehicle model without being separately provided with a vehicle selection region, and the user does not need to determine which operation identifier in the vehicle selection region corresponds to which parked vehicle. This can improve efficiency of determining the reference vehicle.

In an example, the first user interface further includes a virtual vehicle model corresponding to the target vehicle, and the first user interface further includes an icon indicating the target vehicle. In this way, when the user selects the reference vehicle from the one or more parked vehicles, a reference can be provided for the user, so that the user distinguishes between the target vehicle and the parked vehicle. Similarly, the second user interface may also include the virtual vehicle model corresponding to the target vehicle, and the second user interface may further include the icon indicating the target vehicle.

It should be noted that the virtual vehicle model may be a two-dimensional virtual vehicle model, or may be a three-dimensional virtual vehicle model.

The first operation of the user includes any one of a touch action, a tapping action, and a sliding action of the user on the first user interface. For example, the virtual vehicle model is used as an example. The user selects the reference vehicle by touching the virtual vehicle model, or by tapping the virtual vehicle model, or by sliding the virtual vehicle model. For another example, the foregoing operation identifier is used as an example. The user selects the reference vehicle by touching the operation identifier, or by tapping the operation identifier, or by sliding the operation identifier. This is not limited in this application.

In an embodiment, the second user interface includes only the reference vehicle, that is, the second user interface does not include another parked vehicle. Alternatively, in an embodiment, the second user interface not only includes the reference vehicle, but also includes another parked vehicle. For example, the second user interface further includes a second vehicle, and the second vehicle is any vehicle other than the reference vehicle in the one or more parked vehicles; and a display manner of the reference vehicle is different from that of the second vehicle. For example, a display color of the reference vehicle is different from that of another parked vehicle, or thickness of a contour line of the reference vehicle is different from that of another parked vehicle, or a background texture of the reference vehicle is different from that of another parked vehicle. In conclusion, the user can visually distinguish between the reference vehicle and the another parked vehicle that are included on the second user interface.

In some embodiments, the second user interface further includes an indication identifier, and the indication identifier indicates the reference vehicle.

Because a parking location and a parking direction of each of the one or more parked vehicles are determined in a same manner, the following uses any one of the one or more parked vehicles as an example for description. For ease of description, the any vehicle is referred to as a first vehicle. In other words, for the first vehicle in the one or more parked vehicles, an electronic device inputs a surround-view image into a vehicle detection model, to obtain a parking location and a partial image of the first vehicle. The partial image is an image region that is in the surround-view image and that includes the first vehicle. Then, a parking direction of the first vehicle is determined in the following operations (1) and (2).

(1) Input parking information of the first vehicle into a key information detection model, to determine attribute information of a plurality of key points of the first vehicle and attribute information of a plurality of key lines of the first vehicle.

In some embodiments, the parking information of the first vehicle is the partial image of the first vehicle. The partial image of the first vehicle is input into the key information detection model, to obtain the attribute information of the plurality of key points of the first vehicle and the attribute information of the plurality of key lines of the first vehicle that are output by the key information detection model.

The attribute information of the key point includes at least one of a key point location, a key point category, and key point visibility, and the key point visibility indicates whether a corresponding key point is blocked. The attribute information of the key line includes at least one of a key line central point location, key line visibility, a key line inclination, and a key line length, and the key line visibility indicates whether a corresponding key line is blocked.

The key points include four wheel central points, a vehicle body central point, a vehicle logo central point, two rear light central points, and the like. The key lines of the first vehicle include vertical central lines at positions at which license plates are installed in front of and behind the vehicle, a vertical central line between a vehicle logo and a vehicle top, and the like. These key points and key lines can be combined in a plurality of manners to determine the parking direction of the first vehicle.

(2) Input the attribute information of the plurality of key points of the first vehicle and the attribute information of the plurality of key lines of the first vehicle into a pose estimation model, to determine the parking direction of the first vehicle.

In some embodiments, the attribute information of the plurality of key points of the first vehicle and the attribute information of the plurality of key lines are input into a pose estimation model, to obtain a parking direction that is of the first vehicle in an image coordinate system of a partial image and that is output by the pose estimation model, and the parking direction of the first vehicle in the image coordinate system of the partial image is converted into a parking direction in a vehicle body coordinate system of the target vehicle, to obtain the parking direction of the first vehicle.

Based on the foregoing description, the parking direction includes a vehicle front orientation and a vehicle body direction. To describe a vehicle body pose more accurately, in addition to the vehicle body direction, a vehicle body angle further needs to be determined. In this case, the parking direction output by the attitude estimation model includes not only the vehicle front orientation and vehicle body direction, but also the vehicle body angle. Because an extrinsic parameter of the vehicle-mounted surround-view cameras affects the vehicle body angle to some extent, after the pose estimation model outputs the vehicle body angle, external parameter compensation needs to be performed on the basis of the vehicle body angle. That is, a compensation angle is determined, where the compensation angle is an included angle between an imaging plane of the vehicle-mounted surround-view cameras and a connection line between a focus of the vehicle-mounted surround-view cameras and a central point of the first vehicle. The vehicle body angle output by the pose estimation model is added to the compensation angle, to obtain a vehicle body angle of the first vehicle in the image coordinate system of the partial image. Then, the parking direction of the first vehicle in the image coordinate system of the partial image is converted into a parking direction in the vehicle body coordinate system of the target vehicle, to obtain the vehicle body direction of the first vehicle.

In the technical solutions provided in this application, a parking direction of a vehicle is determined by using the attribute information of the key points and the key lines. For a same vehicle, attribute information of different key points and key lines can be easily obtained through simulation data, CAD, or the like, and a large quantity of samples can be obtained. The key information detection model and the pose estimation model are trained by using these samples. This can improve accuracy and robustness of determining the parking direction of the vehicle.

When stability of the plurality of determined key points and the plurality of determined key lines decreases because the first vehicle is blocked, to improve accuracy of the determined parking direction of the first vehicle. In this application, the parking direction of the first vehicle can be determined based on a plurality of surround-view images. In other words, the plurality of surround-view images are fused to determine the parking direction of the first vehicle.

In a second implementation, parking locations and parking directions of the one or more parked vehicles are determined based on the parking information of the one or more parked vehicles. Based on the parking locations and the parking directions of the one or more parked vehicles, the reference vehicle is determined by using a preset model.

In an example, the parking locations and the parking directions of the one or more parked vehicles are determined based on the parking information of the one or more parked vehicles. An available parking space is determined based on the parking locations of the one or more parked vehicles, where the available parking space is a region other than the parking locations of the one or more parked vehicles in the parking region. A distance between the target vehicle and the available parking space is determined, a moving direction of the target vehicle is determined, and the distance between the target vehicle and the available parking space, the moving direction of the target vehicle, and the parking directions of the one or more parked vehicles are input into the preset model, to determine the reference vehicle.

It should be noted that the preset model is obtained through training in advance based on a plurality of sample vehicles, for example, obtained through training in a reinforcement learning manner. In addition, for an implementation process of determining the parking locations and the parking directions of the one or more parked vehicles based on the parking information of the one or more parked vehicles, refer to related descriptions in the first implementation. Details are not described herein again. In addition, an implementation of determining the available parking space based on the parking locations of the one or more parked vehicles is described below, and details are not described herein.

In this application, the reference vehicle can be determined not only by using the preset model, but also by using a parking pose rule. In other words, the parking locations and the parking directions of the one or more parked vehicles are determined based on the parking information of the one or more parked vehicles. Based on the parking locations and the parking directions of the one or more parked vehicles, the reference vehicle is determined by using the parking pose rule.

The parking pose rule is a rule for determining a reference vehicle based on a priority of a vehicle body direction. For example, the priority of vehicle body direction in a descending order is a vertical direction, a horizontal direction, and an oblique direction. In other words, if there is a parked vehicle whose vehicle body direction is the vertical direction in the one or more parked vehicles, the parked vehicle whose vehicle body direction is the vertical direction is determined as the reference vehicle. If there is no parked vehicle whose vehicle body direction is the vertical direction but there is a parked vehicle whose vehicle body direction is the horizontal direction in the one or more parked vehicles, the parked vehicle whose vehicle body direction is the horizontal direction is determined as the reference vehicle. If there is no parked vehicle whose vehicle body direction is the vertical direction and no parked vehicle whose vehicle body direction is the horizontal direction in the one or more parked vehicles, but there is a parked vehicle whose vehicle body direction is the oblique direction, the parked vehicle whose vehicle body direction is the oblique direction is determined as the reference vehicle.

It should be noted that when there are a plurality of parked vehicles that meet the condition, one vehicle is randomly selected as the reference vehicle, or one vehicle is selected as the reference vehicle according to another rule. For example, a vehicle closest to the target vehicle is selected as the reference vehicle. This is not limited in this application.

In the foregoing second implementation, after the parking locations and the parking directions of the one or more parked vehicles are determined, the reference vehicle can be automatically determined by using the preset model or the parking pose rule. In this way, a user can avoid manually selecting the reference vehicle. This can simplify user operations.

The parking direction of the target vehicle includes a vehicle front orientation and a vehicle body direction of the target vehicle. The vehicle body direction of the target vehicle is a direction of a vehicle body of the target vehicle relative to a reference object, and the reference object includes a road baseline, a reference vehicle, or another reference object. For example, the vehicle body direction of the target vehicle is a direction of the vehicle body of the target vehicle relative to the reference vehicle, and the vehicle body direction of the target vehicle is parallel to, vertical to, and inclined to that of the reference vehicle.

An implementation of determining a target virtual parking slot based on parking information of the reference vehicle includes: determining a parking direction of the reference vehicle based on the parking information of the reference vehicle; determining an available parking space based on the parking information of the one or more parked vehicles; and determining the target virtual parking slot based on the parking direction of the reference vehicle and the available parking space.

In some embodiments, a ground region in the surround-view image is extracted, a feature of each of a plurality of pixels is included in the extracted ground region, and the plurality of pixels are clustered based on features of the plurality of pixels, to obtain a plurality of regions, a parking region is determined from the plurality of regions. An available parking space in the parking region is determined based on the parking information of the one or more parked vehicles.

In an example, the surround-view image is used as an input of the ground segmentation model, to obtain a ground region output by the ground segmentation model. The ground region is used as an input of a feature extraction model, to obtain features of a plurality of pixels that are included in the ground region and that are output by the feature extraction model. The plurality of pixels are clustered based on the features of the plurality of pixels, to obtain a plurality of regions. A region feature corresponding to each of the plurality of regions is determined, and a semantic category of each of the plurality of regions is determined based on region features of the plurality of regions. If there is a region whose semantic category is a parking category in the plurality of regions, the region whose semantic category is the parking category is determined as the parking region, and the available parking space from the parking region is determined based on the parking information of the one or more parked vehicles. If there is no region whose semantic category is the parking category in the plurality of regions, the parking region from the plurality of regions is determined based on the region features and the semantic categories of the plurality of regions, and the available parking space from the parking region is determined based on the parking information of the one or more parked vehicles.

It should be noted that the ground region includes a parking region, a road region, a manhole lid region, a lawn region, and the like. That the plurality of pixels are clustered based on the features of the plurality of pixels means that pixels with close distances between features are divided into one region, to obtain a plurality of regions.

There are a plurality of implementations of determining the region feature corresponding to each of the plurality of regions. For example, for one of the regions, an average value is obtained for features of all pixels included in the region, to obtain a region feature corresponding to the region. Alternatively, the features of all pixels included in the region are fused to obtain a region feature corresponding to the region. For example, the features of all pixels included in the region are combined into a matrix, and the matrix is used as the region feature of the region.

An implementation process of determining the semantic category of each of the plurality of regions based on the region features of the plurality of regions includes: for each of the plurality of regions, determining a distance between a region feature corresponding to the region and each stored region feature that includes a semantic category, and determining a semantic category corresponding to a region feature that is closest to the region feature corresponding to the region as the semantic category of the region.

It should be noted that, to improve clustering effect and improve accuracy of the semantic category corresponding to each region, multi-frame fusion can be performed based on the plurality of surround-view images in this application. That is, for the plurality of surround-view images, the ground region in each surround-view image is determined according to the foregoing method, to obtain a plurality of ground regions. Then, an overlapping region in the plurality of ground regions is obtained. Then, the feature of each pixel in the overlapping region is extracted according to the foregoing method, and clustering is performed to determine the available parking space.

There are a plurality of manners of determining the target virtual parking slot based on the parking direction and the available parking space of the reference vehicle, and the following separately describes the manners.

In a first implementation, a plurality of candidate virtual parking slots are determined based on the parking direction of the reference vehicle and the available parking space, and the target virtual parking slot is determined from the plurality of candidate virtual parking slots in response to a second operation of the user.

In an example, the plurality of candidate virtual parking slots are determined based on the parking direction of the reference vehicle and the available parking space, and a fourth user interface is displayed. The fourth user interface includes the plurality of candidate virtual parking slots. The third user interface is displayed in response to the second operation of the user. The third user interface includes the target virtual parking slot.

In other words, after the plurality of candidate virtual parking slots are determined based on the parking direction of the reference vehicle and the available parking space, the fourth user interface is displayed. The user triggers the second operation in the fourth user interface, to determine the target virtual parking slot from the plurality of candidate virtual parking slots.

In some embodiments, the third user interface further displays an available parking space, and the target virtual parking slot is located in the available parking space.

An implementation process of determining the plurality of candidate virtual parking slots based on the parking direction of the reference vehicle and the available parking space includes: using the parking direction of the reference vehicle as a parking direction of the target vehicle, and determining the plurality of candidate virtual parking slots in the available parking space, so that a parking direction indicated by the plurality of candidate virtual parking slots is the parking direction of the target vehicle. In other words, the parking direction of the reference vehicle is directly used as the parking direction of the target vehicle, to determine the plurality of candidate virtual parking slots in the available parking space.

Certainly, the user may not be satisfied with the parking direction of the reference vehicle. Therefore, the electronic device displays the second user interface. The second user interface includes the reference vehicle. The second user interface can further indicate the parking direction of the reference vehicle, and use the parking direction of the reference vehicle as a reference parking direction. In this case, the third operation is used to adjust the reference parking direction in response to a third operation of the user, and an adjusted parking direction is determined as the parking direction of the target vehicle. The plurality of candidate virtual parking slots in the available parking space is determined based on the parking direction of the target vehicle, so that the parking direction indicated by the plurality of candidate virtual parking slots is the parking direction of the target vehicle.

In an embodiment, when there are a plurality of parked vehicles around the target vehicle, the plurality of parked vehicles may be distributed on one side of a driving road of the target vehicle, or may be distributed on two sides of a driving road of the target vehicle. When the plurality of parked vehicles are distributed on two sides of the driving road of the target vehicle, a target virtual vehicle is determined based on parking information of reference vehicles on the two sides of the driving road of the target vehicle. In other words, one reference vehicle may be separately determined from the parked vehicles that are on the two sides of the driving road of the target vehicle according to the foregoing method. In this way, one parking space is separately determined from two sides of the driving road according to the foregoing method, and the plurality of candidate virtual parking slots are separately determined from the available parking space on the two sides of the driving road based on reference vehicles on the two sides of the driving road of the target vehicle, to determine the target virtual parking slot according to the foregoing method.

In an embodiment, regardless of whether the plurality of candidate virtual parking slots are represented by using a plurality of virtual vehicle models, or the plurality of candidate virtual parking slots are represented by using the black rectangular frame or in another display manner, after the plurality of candidate virtual parking slots are determined, a vehicle front orientation corresponding to the plurality of candidate virtual parking slots may be displayed.

In a second implementation, the candidate virtual parking slot is determined based on the parking direction of the reference vehicle and the available parking space. If there is one candidate virtual parking slot, the candidate virtual parking slot is directly used as the target virtual parking slot. If there are a plurality of candidate virtual parking slots, one candidate virtual parking slot is selected from the plurality of candidate virtual parking slots as the target virtual parking slot.

For a manner of determining the candidate virtual parking slot based on the parking direction of the reference vehicle and the available parking space, refer to the foregoing first implementation. Details are not described herein again.

In addition, there are a plurality of implementations of selecting one candidate virtual parking slot from the plurality of candidate virtual parking slots as the target virtual parking slot. For example, one candidate virtual parking slot is selected from the plurality of candidate virtual parking slots as the target virtual parking slot and is recommended to the user. Alternatively, the plurality of candidate virtual parking slots are recommended to the user, and the user selects one candidate virtual parking slot as the target virtual parking slot. When one candidate virtual parking slot is selected from the plurality of candidate virtual parking slots as the target virtual parking slot and is recommended to the user, a candidate virtual parking slot that is closest to a current location of the target vehicle may be selected from the plurality of candidate virtual parking slots with reference to a distance between the current location of the target vehicle and the candidate virtual parking slot, and is recommended to the user as the target virtual parking slot. Certainly, one candidate virtual parking slot may be selected, in another manner, and recommended to the user.

In an example, after one candidate virtual parking slot is selected from the plurality of candidate virtual parking slots, a fifth user interface is displayed. The fifth user interface includes the recommended virtual parking slot. A third user interface is displayed in response to a fourth operation of the user. The fourth operation is used to indicate the user to confirm that the recommended virtual parking slot is used as the target virtual parking slot.

In another example, after one candidate virtual parking slot is selected from the plurality of candidate virtual parking slots, a fifth user interface is displayed. The fifth user interface includes the recommended virtual parking slot. A fourth user interface is displayed in response to a fifth operation of the user. The fourth user interface includes the plurality of candidate virtual parking slots, and the fifth operation is used to indicate that the user is not satisfied with the recommended parking location of the virtual parking slot. A third user interface is in response to a second operation of the user. The second operation is used to select a target virtual parking slot from the plurality of candidate virtual parking slots.

In other words, when one candidate virtual parking slot is selected from the plurality of candidate virtual parking slots and is recommended to the user as the target virtual parking slot, the user may directly accept the recommended virtual parking slot, that is, the recommended virtual parking slot is used as the target virtual parking slot. Certainly, the user may not be satisfied with the parking location of the recommended virtual parking slot. In this case, all the plurality of candidate virtual parking slots need to be recommended to the user, and the user selects one candidate virtual parking slot as the target virtual parking slot.

In a third implementation, the second user interface further includes an available parking space. A sixth operation is used to select, in response to the sixth operation of the user, a location from the available parking space as the parking location of the target vehicle. The target virtual parking slot is determined based on the parking direction of the reference vehicle and the parking location of the target vehicle.

In other words, the user selects a location from the available parking space as the parking location of the target vehicle, and then determines the target virtual parking slot based on the parking direction of the reference vehicle and the parking location of the target vehicle.

When the target virtual parking slot is determined based on the parking direction of the reference vehicle and the parking location of the target vehicle, the parking direction of the reference vehicle may be directly used as the parking direction of the target vehicle, and the target virtual parking slot is determined at the parking location of the target vehicle in the available parking space, so that a parking direction indicated by the target virtual parking slot is the parking direction of the target vehicle. Certainly, the user may not be satisfied with the parking direction of the reference vehicle. Therefore, the electronic device displays the second user interface. The second user interface includes the reference vehicle. The second user interface can further indicate the parking direction of the reference vehicle, and use the parking direction of the reference vehicle as a reference parking direction. In this case, the third operation is used to adjust the reference parking direction in response to a third operation of the user, and an adjusted parking direction is determined as the parking direction of the target vehicle. The target virtual parking slot is determined at the parking location of the target vehicle in the available parking space based on the parking direction of the target vehicle, so that a parking direction indicated by the target virtual parking slot is the parking direction of the target vehicle.

The foregoing content is an implementation process of determining the target virtual parking slot when there is a parked vehicle around the target vehicle. In some cases, there may be no parked vehicle around the target vehicle. In this case, the electronic device performs three-dimensional space measurement on the available parking space, to determine a depth of the available parking space. Then, the parking direction of the target vehicle is determined based on a ratio of the depth of the available parking space to a vehicle body length of the target vehicle. In addition, the parking location of the target vehicle is determined in the available parking space, to determine the target virtual parking slot.

In an example, if the ratio of the depth of the available parking space to the vehicle body length of the target vehicle is greater than a first proportion threshold, it is determined that the vehicle body direction of the target vehicle relative to a road baseline is a vertical direction. If the ratio of the depth of the available parking space to the vehicle body length of the target vehicle is less than a second proportion threshold, it is determined that the vehicle body direction of the target vehicle relative to the road baseline is a horizontal direction. If the ratio of the depth of the available parking space to the vehicle body length of the target vehicle is less than the first proportion threshold but is greater than the second proportion threshold, it is determined that the vehicle body direction of the target vehicle relative to the road baseline is an oblique direction, where an oblique angle of the oblique direction is an arc sine value of the depth of the available parking space and the vehicle body length of the target vehicle.

It should be noted that the first proportion threshold and the second proportion threshold are preset, and can be adjusted based on different requirements. For example, the first proportion threshold is 0.9, and the second proportion threshold is 0.7.

In addition, when the parking location of the target vehicle is determined in the available parking space, reference may be made to the foregoing method, and the user selects a location in the available parking space as the parking location of the target vehicle. Certainly, the electronic device may also determine a plurality of candidate virtual parking slots in the available parking space based on the parking direction of the target vehicle with reference to the foregoing method, and the user selects one candidate virtual parking slot as the target virtual parking slot. For a manner in which the user selects a location from the available parking space as the parking location of the target vehicle, and a manner in which the user selects a candidate virtual parking slot from a plurality of candidate virtual parking slots as the target virtual parking slot, refer to the foregoing descriptions. Details are not described herein again.

According to a second aspect, a display method for assisted parking is provided. In the method, a first user interface is displayed. The first user interface is used to display environment information around a target vehicle, the target vehicle is a to-be-parked vehicle, and the environment information includes parking information of one or more parked vehicles. A second user interface is displayed in response to a first operation of a user. The second user interface includes a reference vehicle, and the reference vehicle is one of the one or more parked vehicles. A third user interface is displayed. The third user interface includes a target virtual parking slot, and the target virtual parking slot indicates a parking location and a parking direction of the target vehicle.

In an embodiment, the second user interface further includes a second vehicle, and the second vehicle is any vehicle other than the reference vehicle in the one or more parked vehicles; and a display manner of the reference vehicle is different from that of the second vehicle.

In an embodiment, the second user interface further includes an indication identifier, and the indication identifier indicates the reference vehicle.

In an embodiment, that a third user interface is displayed includes: displaying a fourth user interface, where the fourth user interface includes a plurality of candidate virtual parking slots; and displaying the third user interface in response to a second operation of the user, where the target virtual parking slot is one of the plurality of candidate virtual parking slots.

In an embodiment, the third user interface further displays an available parking space, and the target virtual parking slot is located in the available parking space.

In an embodiment, the first user interface includes one or more operation identifiers, and the one or more operation identifiers one-to-one correspond to the one or more parked vehicles.

In an embodiment, the environment information displayed on the first user interface is image information obtained by a camera or radar.

In an embodiment, the environment information displayed on the first user interface is virtual environment information generated based on information obtained by a sensor.

In an embodiment, the third user interface further includes an icon indicating the target vehicle.

In an embodiment, the first operation of the user includes any one of a touch action, a tapping action, and a sliding action of the user on the first user interface.

According to a third aspect, an apparatus for determining a virtual parking slot is provided. The apparatus has a function of implementing the behavior in the method for determining the virtual parking slot according to the first aspect. The apparatus includes at least one module. The at least one module is configured to implement the method for determining the virtual parking slot according to the first aspect.

According to a fourth aspect, a display apparatus for assisted parking is provided. The apparatus has a function of implementing the behavior in the display method for assisted parking according to the second aspect. The apparatus includes at least one module. The at least one module is configured to implement the display method for assisted parking according to the second aspect.

According to a fifth aspect, an electronic device is provided. The electronic device includes a processor and a memory. The memory is configured to store a computer program for performing the method for determining the virtual parking slot according to the first aspect. The processor is configured to execute the computer program stored in the memory, to implement the method for determining the virtual parking slot according to the first aspect.

In an embodiment, the electronic device may further include a communication bus, and the communication bus is configured to establish a connection between the processor and the memory.

According to a sixth aspect, an electronic device is provided. The electronic device includes a processor and a memory. The memory is configured to store a computer program for performing the display method for assisted parking according to the second aspect. The processor is configured to execute the computer program stored in the memory, to implement the display method for assisted parking according to the second aspect.

In an embodiment, the electronic device may further include a communication bus, and the communication bus is configured to establish a connection between the processor and the memory.

According to a seventh aspect, a computer-readable storage medium is provided. The storage medium stores instructions, and when the instructions are run on a computer, the computer is enabled to perform the operations of the method for determining the virtual parking slot according to the first aspect.

According to an eighth aspect, a computer-readable storage medium is provided. The storage medium stores instructions, and when the instructions are run on a computer, the computer is enabled to perform the operations of the display method for assisted parking according to the second aspect.

According to a ninth aspect, a computer program product including instructions is provided. When the instructions are run on a computer, the computer is enabled to perform the operations of the method for determining the virtual parking slot according to the first aspect. In other words, a computer program is provided. When the computer program is run on a computer, the computer is enabled to perform the operations of the method for determining the virtual parking slot according to the first aspect.

According to a tenth aspect, a computer program product including instructions is provided. When the instructions are run on a computer, the computer is enabled to perform the operations of the display method for assisted parking according to the second aspect. In other words, a computer program is provided. When the computer program is run on a computer, the computer is enabled to perform the operations of the display method for assisted parking according to the second aspect.

Technical effect obtained in the third aspect to the tenth aspect is similar to technical effect obtained by using corresponding technical means in the first aspect and the second aspect. Details are not described herein again.

The technical solutions provided in this application include at least the following beneficial effect:

In the technical solutions provided in this application, one vehicle is selected from the one or more parked vehicles around the target vehicle as the reference vehicle, and the target virtual parking slot is determined based on the parking direction of the reference vehicle. This can ensure that the target vehicle and the selected reference vehicle are arranged in a consistent manner after automatic parking is performed in the virtual parking slot, and improves parking neatness and convenience.

DESCRIPTION OF EMBODIMENTS

Figure 1:
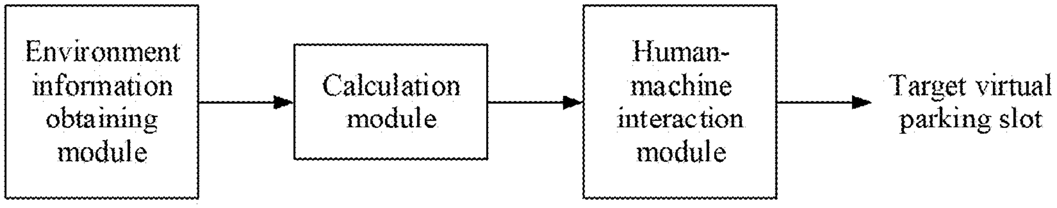
FIG. 1 is a schematic diagram of a structure of an electronic device according to an embodiment of this application.

To make the objectives, technical solutions, and advantages of this application clearer, the following further describes the implementations of this application in detail with reference to the accompanying drawings.

For ease of understanding, before a method for determining a virtual parking slot provided in embodiments of this application is described in detail, terms in embodiments of this application are first explained.

Virtual parking slot: The virtual parking slot is a fictional parking slot created when a vehicle is automatically parked. If there is an interaction interface, the virtual parking slot is displayed on the interface. When the vehicle parks into the virtual parking slot, a location of the vehicle is the same as that in a real parking region.

Parking direction: The parking direction includes a vehicle front orientation and a vehicle body direction. The vehicle body direction means a direction of a vehicle body relative to a reference object. The reference object includes a road baseline, a reference vehicle, or another reference object.

The vehicle front orientation includes a driving direction facing a target vehicle and a driving direction back to the target vehicle, and the vehicle body direction includes eight directions such as due east, due south, due west, due north, southeast, northeast, southwest, and northwest. To describe a vehicle body pose more accurately, in addition to the vehicle body direction, a vehicle body angle further needs to be determined. The vehicle body angle is an included angle between a vehicle body and a reference object.

It should be noted that the foregoing eight directions are only an example. In another example, eight directions may be randomly obtained through division by using an angle of 45 degrees as an interval. This is not limited in embodiments of this application.

Marked parking slot: The marked parking slot is a parking slot marked with a parking slot line or an obvious prompt (such as an entire block with a color, a brick with a different texture, and a three-dimensional limiting device) on the ground.

Non-marked parking region: The non-marked parking region is a parking region without a parking slot line or a parking slot prompt sign on the ground.

Parking navigation: Parking navigation is a process in which a vehicle searches for a parking slot before the vehicle parks into the parking slot.

The method for determining the virtual parking slot provided in embodiments of this application is applied to a plurality of scenarios, for example, various auxiliary driving systems or self-driving systems such as parking slot recommendation, automatic parking assist (APA), remote parking assist (RPA), automated valet parking (AVP), and memory parking assist (HZP). In addition, this method is applicable to the marked parking slot and the non-marked parking region. For the non-marked parking region, for example, in a scenario of a non-marked parking lot, an exit/entrance of a hotel office, or temporary parking on two sides of a road or a passageway, technical solutions provided in this application can be used to automatically generate a virtual parking slot based on parking information of a parked vehicle in the parking region and space information of the parking region, without a user adjusting a location of the virtual parking slot for a plurality of times. For the marked parking slot, embodiments of this application can be used to park, without being affected by an indication of the marked parking slot, a target vehicle in a parking region required by a user. For example, when the marked parking slot that the user needs to park is partially occupied by a vehicle parked on an adjacent side, and the user cannot park the target vehicle based on a marked parking slot indication, the target vehicle may be parked in parallel with the vehicle parked on the side in a space on the other side.

The APA is the most common parking assistance system in life. When a to-be-parked target vehicle performs parking navigation at a low speed, the APA system uses ultrasonic radar to obtain environment information around the target vehicle, so as to help a user search for a virtual parking slot that is sufficient for parking the target vehicle from an available parking space. After the user sends a parking instruction, automatic parking is implemented in the virtual parking slot.

The RPA is developed based on the APA and is mainly applied in a narrow parking slot, to resolve a problem that after a vehicle is parked, a door is difficult to open. For example, a user first enables an RPA system in a vehicle, the RPA system searches for and determines a virtual parking slot, the user sends a parking instruction outside the vehicle by using a remote control apparatus, and the RPA system implements automatic parking in the virtual parking slot.

The AVP searches for and determines a virtual parking slot by using the AVP system, implements automatic parking in the virtual parking slot, and then sends parking location information to a user.

The HZP first travels a target vehicle to a fixed parking slot, determines a virtual parking slot in the fixed parking slot, and parks the target vehicle into the virtual parking slot. However, before automatic parking, the user needs to record a fixed driving path and a fixed parking slot, so that the target vehicle "learns" the process. After "learning" is completed, the target vehicle may automatically park in or out from a start point on one side of the fixed driving path.

Embodiments of this application are executed by a vehicle-mounted terminal. In other words, after determining the virtual parking slot in the manner provided in embodiments of this application, the vehicle-mounted terminal can implement automatic parking of the target vehicle. Certainly, when the target vehicle currently needs to be parked in the parking lot, embodiments of this application are executed by a vehicle-mounted terminal or a parking lot management device. When the execution body is the parking lot management device, after determining the virtual parking slot according to the method provided in embodiments of this application, the parking lot management device sends related information of the virtual parking slot to the vehicle-mounted terminal, and the vehicle-mounted terminal implements automatic parking of the target vehicle.

For ease of description, an execution body of embodiments of this application is generally referred to as an electronic device. FIG. 1 is a schematic diagram of a structure of an electronic device according to an embodiment of this application. The electronic device includes an environment information obtaining module, a calculation module, and a human-machine interaction module. The environment information obtaining module is configured to obtain environment information around a target vehicle, for example, parking information of one or more parked vehicles. The calculation module and the human-machine interaction module cooperate with each other to determine a target virtual parking slot, for example, a parking location and a parking direction of the target vehicle. Finally, the target virtual parking slot is displayed through the human-machine interaction module.

The electronic device is any electronic product that can perform human-machine interaction with a user in one or more manners such as a keyboard, a touchpad, a touchscreen, a remote control, a voice interaction device, or a handwriting device, for example, a personal computer (PC), a mobile phone, a smartphone, a personal digital assistant (PDA), a wearable device, a pocket computer (PPC), a tablet computer, or a smart head unit.

One of ordinary skilled in the art should understand that the foregoing application scenario and the electronic device are only an example. Another existing or future application scenario and the electronic device that are applicable to embodiments of this application should also fall within the protection scope of embodiments of this application, and is included herein by reference.

The following describes in detail the method for determining the virtual parking slot provided in embodiments of this application.

Figure 2:
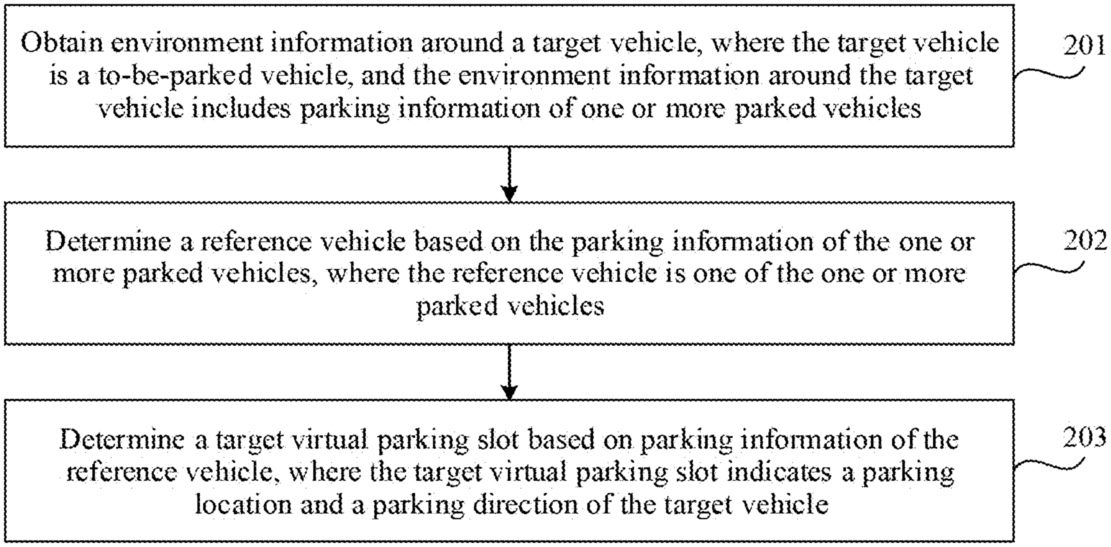
FIG. 2 is a flowchart of a method for determining a virtual parking slot according to an embodiment of this application.

FIG. 2 is a flowchart of a method for determining a virtual parking slot according to an embodiment of this application. The method is applied to the foregoing electronic device. As shown in FIG. 2, the method includes the following operations.

Operation 201: Obtain environment information around a target vehicle, where the target vehicle is a to-be-parked vehicle, and the environment information around the target vehicle includes parking information of one or more parked vehicles.

The environment information around the target vehicle includes at least one of visual data and radar data, and the radar data includes ultrasonic radar data, laser radar data, and millimeter-wave radar data. In other words, the technical solutions provided in this application are applicable to at least one type of data. This improves an application scope of the technical solutions provided in this application.

When data included in the environment information is different, there are a plurality of implementations of obtaining the environment information around the target vehicle. For example, vehicle-mounted surround-view cameras collect an actual environment around the target vehicle, to obtain the visual data around the target vehicle, for example, surround-view images. Sensors such as ultrasonic radar, laser radar and millimeter-wave radar collect the actual environment around the target vehicle, to obtain the radar data around the target vehicle. The method for determining the virtual parking slot provided in an embodiment of the application is described in detail below by using an example in which the environment information around the target vehicle is a surround-view image.

The one or more parked vehicles are parked vehicles around the target vehicle. Therefore, when the environment information around the target vehicle is the surround-view image, the surround-view image includes the parking information of the one or more parked vehicles. The plurality of parked vehicles include two or more parked vehicles.

Operation 202: Determine a reference vehicle based on the parking information of the one or more parked vehicles, where the reference vehicle is one of the one or more parked vehicles.

There are a plurality of manners of determining the reference vehicle based on the parking information of the one or more parked vehicles. The following describes two implementations thereof.

In a first implementation, a first user interface is displayed. The first user interface includes parking locations and parking directions of the one or more parked vehicles, and the parking locations and the parking directions of the one or more parked vehicles are determined based on the parking information of the one or more parked vehicles. A second user interface is displayed in response to a first operation of a user. The second user interface includes the reference vehicle, and the first operation indicates to select the reference vehicle from the one or more parked vehicles.

In other words, after the first user interface is displayed, the user triggers the first operation on the first user interface. When detecting the first operation of the user, the electronic device displays the second user interface in response to the first operation of the user. In this case, the second user interface includes the reference vehicle. In this way, the reference vehicle can be determined from the one or more parked vehicles.

Because the parking locations and the parking directions of the one or more parked vehicles around the target vehicle are displayed on the first user interface, the user can learn of the environment information around the target vehicle on the first user interface, and can select the reference vehicle from the one or more parked vehicles with reference to the environment information around the target vehicle. The reference vehicle finally selected by the user meets an actual requirement of the user. This meets a personalized requirement of the user.

There are a plurality of forms of the first user interface. When the forms of the first user interface are different, manners in which the user selects the reference vehicle on the first user interface are also different. The following separately describes the manners.

In some embodiments, a surround-view image around the target vehicle and a vehicle selection region are displayed on the first user interface. The vehicle selection region includes one or more operation identifiers, and the one or more operation identifiers one-to-one correspond to the one or more parked vehicles. When detecting the first operation performed by the user on any one of the one or more operation identifiers, the electronic device displays the second user interface in response to the first operation of the user.

In other words, after the surround-view image around the target vehicle and the vehicle selection region are displayed on the first user interface, the user triggers the first operation on the any one of the one or more operation identifiers included in the vehicle selection region. In this case, a parked vehicle corresponding to the any operation identifier is determined as the reference vehicle, and the second user interface is displayed.

Because the surround-view image around the target vehicle is a real environment image, the surround-view image around the target vehicle is displayed on the first user interface, so that the user can more intuitively learn of the environment information around the target vehicle.

In an example, the surround-view image further includes the target vehicle. In an embodiment, the first user interface further includes an icon indicating the target vehicle. In this way, when the user selects the reference vehicle from the one or more parked vehicles, a reference can be provided for the user, so that the user distinguishes between the target vehicle and the parked vehicle. Similarly, the second user interface may also include the target vehicle, and the second user interface may further include the icon indicating the target vehicle.

It should be noted that, for either of the first user interface and the second user interface, when the parked vehicle and the target vehicle are displayed on the user interface, the icon indicating the target vehicle can be displayed on the user interface in the foregoing manner, to distinguish the parked vehicle from the target vehicle. Certainly, the parked vehicle and the target vehicle can be distinguished in another manner. In addition, the surround-view image is a two-dimensional surround-view image or a three-dimensional surround-view image.

Figure 3:
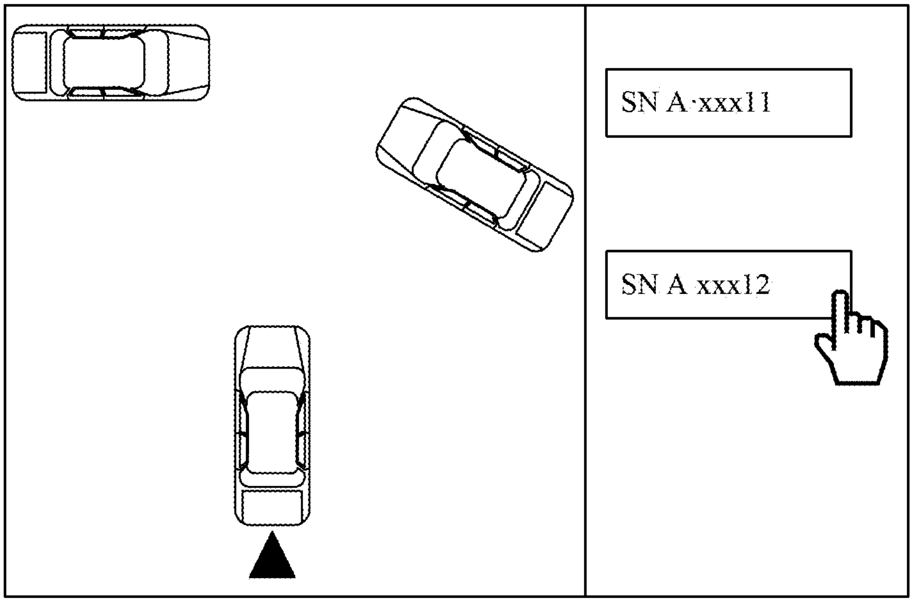
FIG. 3 is a schematic diagram of a first user interface according to an embodiment of this application.

For example, a first user interface is shown in FIG. 3, and two regions are included in FIG. 3: a region used to display a surround-view image and a vehicle selection region. The surround-view image includes a target vehicle and two parked vehicles, and a triangle icon is displayed near a vehicle rear of the target vehicle. An operation identifier included in the vehicle selection region is represented by a license plate number. A user selects a reference vehicle by selecting any license plate number. For example, in FIG. 3, the user selects a vehicle whose license plate number is "SN A xxx12" as the reference vehicle.

For a top view of the vehicle in FIG. 3, a rear line of the vehicle presents a rectangle, and a front line of the vehicle presents a trapezoid. In other words, a part of the rectangular line is the vehicle rear, and a part of the trapezoid line is a vehicle front. The target vehicle is used as an example. A part close to the triangle icon is the vehicle rear, and a part away from the triangle icon is the vehicle front. A vehicle rear location and a vehicle front location mentioned below are the same as those described herein, and details are not described subsequently.

In some other embodiments, parking locations and parking directions of the one or more parked vehicles are determined based on the parking information of the one or more parked vehicles, and one or more virtual vehicle models are displayed on the first user interface based on the parking locations and the parking directions of the one or more parked vehicles. The one or more virtual vehicle models one-to-one correspond to the one or more parked vehicles. When detecting a first operation performed by a user on any one of the one or more virtual vehicle models, the electronic device displays a second user interface in response to the first operation of the user.

In other words, after the one or more virtual vehicle models are displayed on the first user interface, the user triggers the first operation on the any one of the one or more virtual vehicle models. In this case, a parked vehicle corresponding to the any one virtual vehicle model is determined as the reference vehicle, and a second user interface is displayed.

When the one or more virtual vehicle models are displayed on the first user interface, the user can directly operate a virtual vehicle model without being separately provided with a vehicle selection region, and the user does not need to determine which operation identifier in the vehicle selection region corresponds to which parked vehicle. This can improve efficiency of determining the reference vehicle.

In an example, the first user interface further includes a virtual vehicle model corresponding to the target vehicle, and the first user interface further includes an icon indicating the target vehicle. In this way, when the user selects the reference vehicle from the one or more parked vehicles, a reference can be provided for the user, so that the user distinguishes between the target vehicle and the parked vehicle. Similarly, the second user interface may also include the virtual vehicle model corresponding to the target vehicle, and the second user interface may further include the icon indicating the target vehicle.

It should be noted that, for either of the first user interface and the second user interface, when the user interface includes the virtual vehicle model corresponding to the parked vehicle and the virtual vehicle model corresponding to the target vehicle, the icon indicating the target vehicle can be displayed on the user interface in the foregoing manner, to distinguish the parked vehicle from the target vehicle. Certainly, the parked vehicle and the target vehicle can be distinguished in another manner. For example, the virtual vehicle model corresponding to the target vehicle is different from the virtual vehicle model corresponding to the parked vehicle. In addition, the virtual vehicle model may be a two-dimensional virtual vehicle model, or may be a three-dimensional virtual vehicle model.

Figure 4:
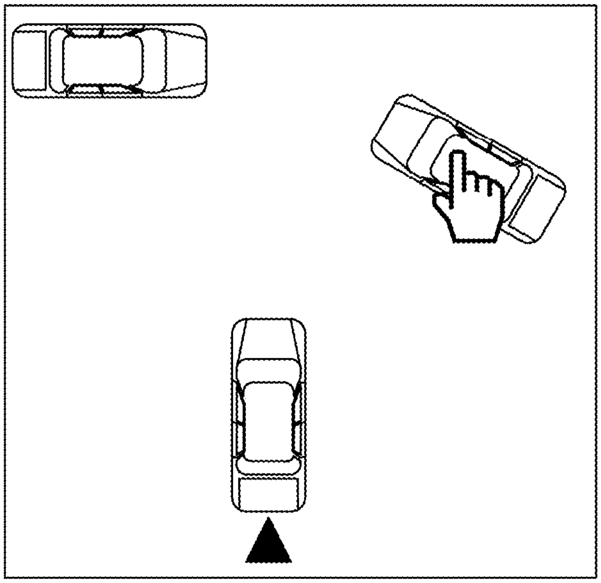
FIG. 4 is a schematic diagram of another first user interface according to an embodiment of this application.

For example, a first user interface is shown in FIG. 4. Three virtual vehicle models are included in FIG. 4. The three virtual vehicle models include a virtual vehicle model corresponding to a target vehicle and virtual vehicle models corresponding to two parked vehicles, and a triangle icon is displayed at the rear of the virtual vehicle model corresponding to the target vehicle. A user clicks either of the virtual vehicle models corresponding to the two parked vehicles, to determine a parked vehicle corresponding to the either of the virtual vehicle models as a reference vehicle.

The first operation of the user includes any one of a touch action, a tapping action, and a sliding action of the user on the first user interface. For example, the virtual vehicle model is used as an example. The user selects the reference vehicle by touching the virtual vehicle model, or by tapping the virtual vehicle model, or by sliding the virtual vehicle model. For another example, the foregoing operation identifier is used as an example. The user selects the reference vehicle by touching the operation identifier, or by tapping the operation identifier, or by sliding the operation identifier. This is not limited in an embodiment of the application.

In an embodiment, the second user interface includes only the reference vehicle, that is, the second user interface does not include another parked vehicle. Alternatively, in an embodiment, the second user interface not only includes the reference vehicle, but also includes another parked vehicle. For example, the second user interface further includes a second vehicle, and the second vehicle is any vehicle other than the reference vehicle in the one or more parked vehicles; and a display manner of the reference vehicle is different from that of the second vehicle. For example, a display color of the reference vehicle is different from that of another parked vehicle, or thickness of a contour line of the reference vehicle is different from that of another parked vehicle, or a background texture of the reference vehicle is different from that of another parked vehicle. In conclusion, the user can visually distinguish between the reference vehicle and the another parked vehicle that are included on the second user interface.

In some embodiments, the second user interface further includes an indication identifier, and the indication identifier indicates the reference vehicle.

Figure 5:
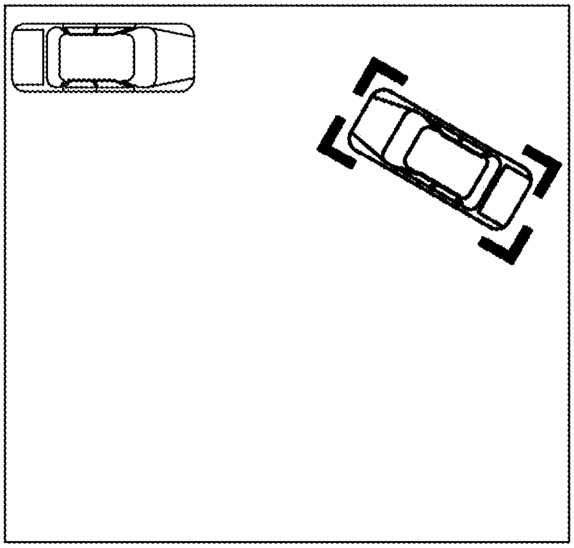
FIG. 5 is a schematic diagram of a second user interface according to an embodiment of this application.

For example, FIG. 5 is a schematic diagram of a second user interface according to an embodiment of this application. In FIG. 5, the second user interface includes a reference vehicle and a second vehicle. The reference vehicle is located on a right side, and the second vehicle is located on a left side. In addition, thickness of a contour line of the reference vehicle in FIG. 5 is different from that of the second vehicle. In addition, the second user interface further includes "L"-shaped indication identifiers around the reference vehicle, and the indication identifiers are used to indicate the reference vehicle.

Because a parking location and a parking direction of each of the one or more parked vehicles are determined in a same manner, the following uses any one of the one or more parked vehicles as an example for description. For ease of description, the any vehicle is referred to as a first vehicle. In other words, for the first vehicle in the one or more parked vehicles, an electronic device inputs a surround-view image into a vehicle detection model, to obtain a parking location and a partial image of the first vehicle. The partial image is an image region that is in the surround-view image and that includes the first vehicle. Then, a parking direction of the first vehicle is determined in the following operations (1) and (2).

(1) Input parking information of the first vehicle into a key information detection model, to determine attribute information of a plurality of key points of the first vehicle and attribute information of a plurality of key lines of the first vehicle.

In some embodiments, the parking information of the first vehicle is the partial image of the first vehicle. The partial image of the first vehicle is input into the key information detection model, to obtain the attribute information of the plurality of key points of the first vehicle and the attribute information of the plurality of key lines of the first vehicle that are output by the key information detection model.

The attribute information of the key point includes at least one of a key point location, a key point category, and key point visibility, and the key point visibility indicates whether a corresponding key point is blocked. The attribute information of the key line includes at least one of a key line central point location, key line visibility, a key line inclination, and a key line length, and the key line visibility indicates whether a corresponding key line is blocked.

The key points include four wheel central points, a vehicle body central point, a vehicle logo central point, two rear light central points, and the like. The key lines of the first vehicle include vertical central lines at positions at which license plates are installed in front of and behind the vehicle, a vertical central line between a vehicle logo and a vehicle top, and the like. These key points and key lines can be combined in a plurality of manners to determine the parking direction of the first vehicle.

In an example, the four wheel central points and the vehicle body central point of the first vehicle are used as the key points of the first vehicle, and the vertical central lines at the positions at which the license plates are installed before and after the first vehicle are used as the key lines of the first vehicle. In another example, the vehicle logo central point of the first vehicle and the two rear light central points are used as the key points of the first vehicle, and the vertical central line between the vehicle logo of the first vehicle and the vehicle top of the first vehicle is used as the key line of the first vehicle.

Figure 6:
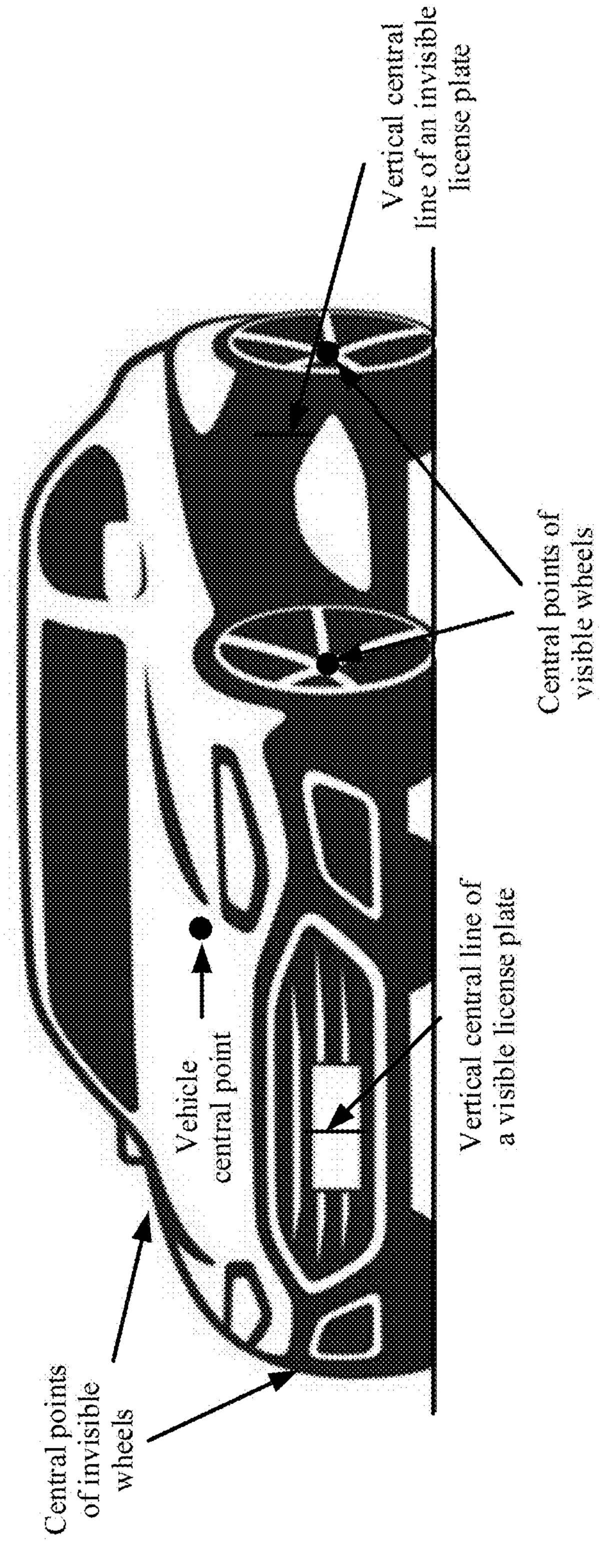
FIG. 6 is a schematic diagram of key points and key lines according to an embodiment of this application.

For example, as shown in FIG. 6, the key points include four wheel central points of the vehicle and a vehicle body central point, and the key lines include vertical central lines at positions at which license plates are installed in front of and behind the vehicle.

In an embodiment, the key information detection model can further output basic attribute information such as a vehicle body size, a vehicle model, a color, a vehicle light status, and a vehicle door status of the first vehicle.

It should be noted that the vehicle detection model and the key information detection model are obtained through training in advance, and structures of the two models are not limited in an embodiment of the application. The structures of the two models may be a neural network or another structure.

(2) Input the attribute information of the plurality of key points of the first vehicle and the attribute information of the plurality of key lines of the first vehicle into a pose estimation model, to determine the parking direction of the first vehicle.

In some embodiments, the attribute information of the plurality of key points of the first vehicle and the attribute information of the plurality of key lines are input into a pose estimation model, to obtain a parking direction that is of the first vehicle in an image coordinate system of a partial image and that is output by the pose estimation model, and the parking direction of the first vehicle in the image coordinate system of the partial image is converted into a parking direction in a vehicle body coordinate system of the target vehicle, to obtain the parking direction of the first vehicle.

Based on the foregoing description, the parking direction includes a vehicle front orientation and a vehicle body direction. To describe a vehicle body pose more accurately, in addition to the vehicle body direction, a vehicle body angle further needs to be determined. In this case, the parking direction output by the attitude estimation model includes not only the vehicle front orientation and vehicle body direction, but also the vehicle body angle. Because an extrinsic parameter of the vehicle-mounted surround-view cameras affects the vehicle body angle to some extent, after the pose estimation model outputs the vehicle body angle, external parameter compensation needs to be performed on the basis of the vehicle body angle. That is, a compensation angle is determined, where the compensation angle is an included angle between an imaging plane of the vehicle-mounted surround-view cameras and a connection line between a focus of the vehicle-mounted surround-view cameras and a central point of the first vehicle. The vehicle body angle output by the pose estimation model is added to the compensation angle, to obtain a vehicle body angle of the first vehicle in the image coordinate system of the partial image. Then, the parking direction of the first vehicle in the image coordinate system of the partial image is converted into a parking direction in the vehicle body coordinate system of the target vehicle, to obtain the vehicle body direction of the first vehicle.

It should be noted that the pose estimation model is obtained through training in advance, and a structure of the pose estimation model is not limited in an embodiment of the application. The structure of the pose estimation model may be a neural network or another structure. In addition, in an embodiment of the application, a parking direction of a vehicle is determined by using the attribute information of the key points and the key lines. For a same vehicle, attribute information of different key points and key lines can be easily obtained through simulation data, CAD, or the like, and a large quantity of samples can be obtained. The key information detection model and the pose estimation model are trained by using these samples. This can improve accuracy and robustness of determining the parking direction of the vehicle.

When stability of the plurality of determined key points and the plurality of determined key lines decreases because the first vehicle is blocked, to improve accuracy of the determined parking direction of the first vehicle. In this application, the parking direction of the first vehicle can be determined based on a plurality of surround-view images. In other words, the plurality of surround-view images are fused to determine the parking direction of the first vehicle.

In an example, partial images corresponding to the first vehicle are separately determined from the plurality of surround-view images, to obtain a plurality of partial images. The plurality of partial images are separately input into the key information detection model, to obtain attribute information of a plurality of key points of the first vehicle and attribute information of a plurality of key lines of the first vehicle in each partial image. Then, the attribute information of the plurality of key points of the first vehicle and the attribute information of the plurality of key lines of the first vehicle in each partial image are separately input into a pose estimation model, to obtain a plurality of initial parking directions that are of the first vehicle and that are output by the pose estimation model. The plurality of initial parking directions one-to-one correspond to the plurality of partial images. The plurality of initial parking directions are averaged, to obtain the parking direction of the first vehicle. Alternatively, confidence levels separately corresponding to the plurality of initial parking directions are determined, and weighted summation is performed on the plurality of initial parking directions and the corresponding confidence levels, to obtain the parking direction of the first vehicle.

In another example, partial images corresponding to the first vehicle are separately determined from the plurality of surround-view images, to obtain a plurality of partial images. The plurality of partial images are input into the key information detection model, to obtain attribute information of a plurality of key points of the first vehicle and attribute information of a plurality of key lines of the first vehicle. Then, the attribute information of the plurality of key points of the first vehicle and the attribute information of the plurality of key lines are input into a pose estimation model, to obtain a parking direction that is of the first vehicle and that is output by the pose estimation model.

Figure 7:
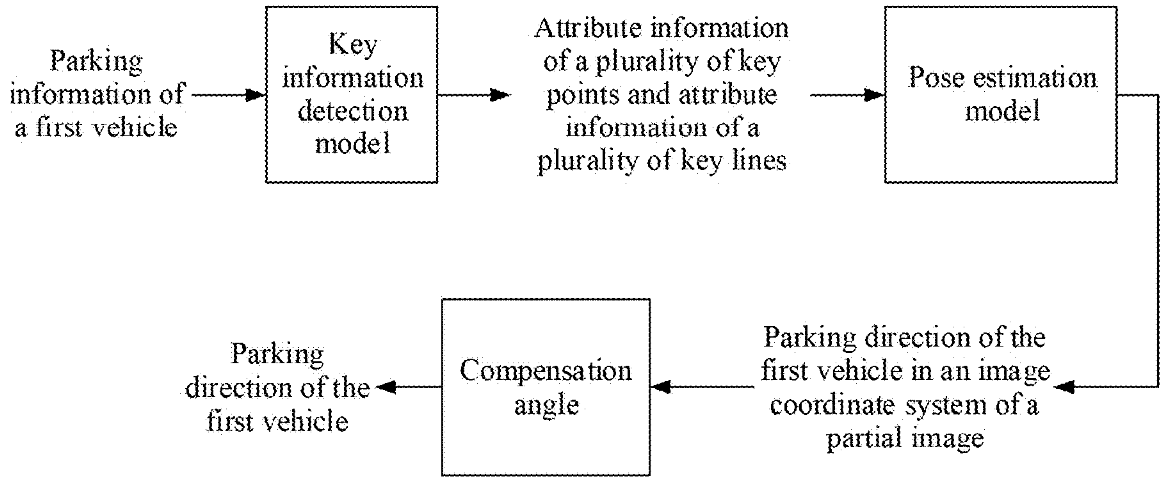
FIG. 7 is a flowchart of determining a parking direction of a first vehicle according to an embodiment of this application.

For example, refer to FIG. 7. FIG. 7 is a flowchart of determining a parking direction of a first vehicle according to an embodiment of the application. In FIG. 7, parking information of the first vehicle is input into a key information detection model, to obtain attribute information of a plurality of key points of the first vehicle and attribute information of a plurality of key lines of the first vehicle. Then, the attribute information of the plurality of key points and the attribute information of the plurality of key lines are input into a pose estimation model, to obtain a parking direction of the first vehicle in an image coordinate system of a partial image. The parking direction includes a vehicle front orientation, a vehicle body direction, and a vehicle body angle. A compensation angle is added on the basis of the vehicle body angle, and the vehicle front orientation, the vehicle body direction, and a compensated vehicle body angle of the first vehicle in the image coordinate system of the partial image are converted into a vehicle front orientation, a vehicle body direction, and a compensated vehicle body angle in a vehicle body coordinate system of the target vehicle, to obtain the parking direction of the first vehicle.

Figure 8:
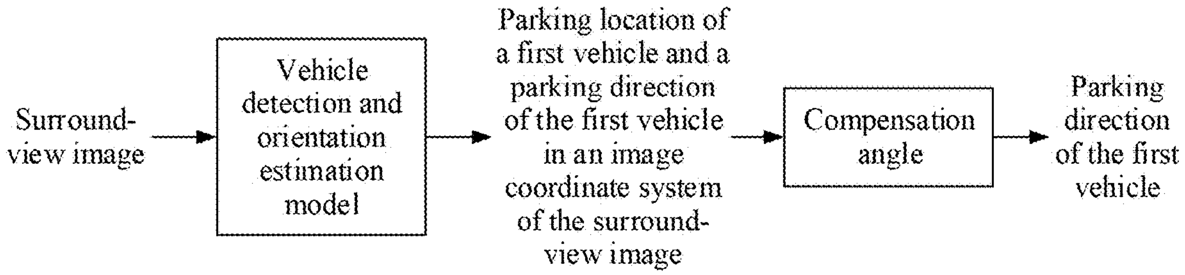
FIG. 8 is another flowchart of determining a parking direction of a first vehicle according to an embodiment of this application.

The foregoing manner of determining a parking location and the parking direction of the first vehicle is only an example. In actual application, the parking location and the parking direction of the first vehicle may be determined in another manner. For example, refer to FIG. 8. A surround-view image is used as an input of a vehicle detection and orientation estimation model, to obtain a parking location of the first vehicle and a parking direction of the first vehicle in an image coordinate system of the surround-view image. The parking direction includes a vehicle front orientation, a vehicle body direction, and a vehicle body angle. A compensation angle is added on the basis of the vehicle body angle, and the vehicle front orientation, the vehicle body direction, and a compensated vehicle body angle of the first vehicle in the image coordinate system of the surround-view image are converted into a vehicle front orientation, a vehicle body direction, and a compensated vehicle body angle in a vehicle body coordinate system of the target vehicle, to obtain the parking direction of the first vehicle.

In a second implementation, parking locations and parking directions of the one or more parked vehicles are determined based on the parking information of the one or more parked vehicles. Based on the parking locations and the parking directions of the one or more parked vehicles, the reference vehicle is determined by using a preset model.

In an example, the parking locations and the parking directions of the one or more parked vehicles are determined based on the parking information of the one or more parked vehicles. An available parking space is determined based on the parking locations of the one or more parked vehicles, where the available parking space is a region other than the parking locations of the one or more parked vehicles in the parking region. A distance between the target vehicle and the available parking space is determined, a moving direction of the target vehicle is determined, and the distance between the target vehicle and the available parking space, the moving direction of the target vehicle, and the parking directions of the one or more parked vehicles are input into the preset model, to determine the reference vehicle.

It should be noted that the preset model is obtained through training in advance based on a plurality of sample vehicles, for example, obtained through training in a reinforcement learning manner. In addition, for an implementation process of determining the parking locations and the parking directions of the one or more parked vehicles based on the parking information of the one or more parked vehicles, refer to related descriptions in the first implementation. Details are not described herein again. In addition, an implementation of determining the available parking space based on the parking locations of the one or more parked vehicles is described below, and details are not described herein.

In an embodiment of the application, the reference vehicle can be determined not only by using the preset model, but also by using a parking pose rule. In other words, the parking locations and the parking directions of the one or more parked vehicles are determined based on the parking information of the one or more parked vehicles. Based on the parking locations and the parking directions of the one or more parked vehicles, the reference vehicle is determined by using the parking pose rule.

The parking pose rule is a rule for determining a reference vehicle based on a priority of a vehicle body direction. For example, the priority of vehicle body direction in a descending order is a vertical direction, a horizontal direction, and an oblique direction. In other words, if there is a parked vehicle whose vehicle body direction is the vertical direction in the one or more parked vehicles, the parked vehicle whose vehicle body direction is the vertical direction is determined as the reference vehicle. If there is no parked vehicle whose vehicle body direction is the vertical direction but there is a parked vehicle whose vehicle body direction is the horizontal direction in the one or more parked vehicles, the parked vehicle whose vehicle body direction is the horizontal direction is determined as the reference vehicle. If there is no parked vehicle whose vehicle body direction is the vertical direction and no parked vehicle whose vehicle body direction is the horizontal direction in the one or more parked vehicles, but there is a parked vehicle whose vehicle body direction is the oblique direction, the parked vehicle whose vehicle body direction is the oblique direction is determined as the reference vehicle.

It should be noted that the priority sequence of vehicle body directions is not limited to the foregoing sequence, and may be another sequence in another example. This is not limited in an embodiment of the application. In addition, when there are a plurality of parked vehicles that meet the condition, one vehicle is randomly selected as the reference vehicle, or one vehicle is selected as the reference vehicle according to another rule. For example, a vehicle closest to the target vehicle is selected as the reference vehicle. This is not limited in an embodiment of the application.

In the foregoing second implementation, after the parking locations and the parking directions of the one or more parked vehicles are determined, the reference vehicle can be automatically determined by using the preset model or the parking pose rule. In this way, a user can avoid manually selecting the reference vehicle. This can simplify user operations.

In an embodiment, the parking pose rule may be a rule for determining a reference vehicle based on a quantity of times that a vehicle body direction appears. For example, based on the vehicle body directions of the one or more parked vehicles, a quantity of times that each vehicle body direction appears is counted, and one vehicle is selected from a parked vehicle in vehicle body directions that appear most frequently as the reference vehicle.

Operation 203: Determine a target virtual parking slot based on parking information of the reference vehicle, where the target virtual parking slot indicates a parking location and a parking direction of the target vehicle.

The parking direction of the target vehicle includes a vehicle front orientation and a vehicle body direction of the target vehicle. The vehicle body direction of the target vehicle is a direction of a vehicle body of the target vehicle relative to a reference object, and the reference object includes a road baseline, a reference vehicle, or another reference object. For example, the vehicle body direction of the target vehicle is a direction of the vehicle body of the target vehicle relative to the reference vehicle, and the vehicle body direction of the target vehicle is parallel to, vertical to, and inclined to that of the reference vehicle.

The target virtual parking slot is determined in the following operations (1) to (3) based on the parking information of the reference vehicle.

(1) Determine a parking direction of the reference vehicle based on the parking information of the reference vehicle.

For an implementation process of determining the parking direction of the reference vehicle, refer to the processing process of determining the parking direction of the first vehicle in operation 202. Details are not described herein again.

(2) Determine an available parking space based on the parking information of the one or more parked vehicles.

In some embodiments, a ground region in the surround-view image is extracted, a feature of each of a plurality of pixels is included in the extracted ground region, and the plurality of pixels are clustered based on features of the plurality of pixels, to obtain a plurality of regions, a parking region is determined from the plurality of regions. An available parking space in the parking region is determined based on the parking information of the one or more parked vehicles.

In an example, the surround-view image is used as an input of the ground segmentation model, to obtain a ground region output by the ground segmentation model. The ground region is used as an input of a feature extraction model, to obtain features of a plurality of pixels that are included in the ground region and that are output by the feature extraction model. The plurality of pixels are clustered based on the features of the plurality of pixels, to obtain a plurality of regions. A region feature corresponding to each of the plurality of regions is determined, and a semantic category of each of the plurality of regions is determined based on region features of the plurality of regions. If there is a region whose semantic category is a parking category in the plurality of regions, the region whose semantic category is the parking category is determined as the parking region, and the available parking space from the parking region is determined based on the parking information of the one or more parked vehicles. If there is no region whose semantic category is the parking category in the plurality of regions, the parking region from the plurality of regions is determined based on the region features and the semantic categories of the plurality of regions, and the available parking space from the parking region is determined based on the parking information of the one or more parked vehicles.

It should be noted that the ground segmentation model and the feature extraction model are obtained through training in advance, and structures of the two models are not limited in an embodiment of the application. The structures of the two models may be a neural network or another structure. The ground region includes a parking region, a road region, a manhole lid region, a lawn region, and the like. That the plurality of pixels are clustered based on the features of the plurality of pixels means that pixels with close distances between features are divided into one region, to obtain a plurality of regions.

There are a plurality of implementations of determining the region feature corresponding to each of the plurality of regions. For example, for one of the regions, an average value is obtained for features of all pixels included in the region, to obtain a region feature corresponding to the region. Alternatively, the features of all pixels included in the region are fused to obtain a region feature corresponding to the region. For example, the features of all pixels included in the region are combined into a matrix, and the matrix is used as the region feature of the region.

An implementation process of determining the semantic category of each of the plurality of regions based on the region features of the plurality of regions includes: for each of the plurality of regions, determining a distance between a region feature corresponding to the region and each stored region feature that includes a semantic category, and determining a semantic category corresponding to a region feature that is closest to the region feature corresponding to the region as the semantic category of the region.

It should be noted that, to improve clustering effect and improve accuracy of the semantic category corresponding to each region, multi-frame fusion can be performed based on the plurality of surround-view images in an embodiment of the application. That is, for the plurality of surround-view images, the ground region in each surround-view image is determined according to the foregoing method, to obtain a plurality of ground regions. Then, an overlapping region in the plurality of ground regions is obtained. Then, the feature of each pixel in the overlapping region is extracted according to the foregoing method, and clustering is performed to determine the available parking space.

Figure 9:
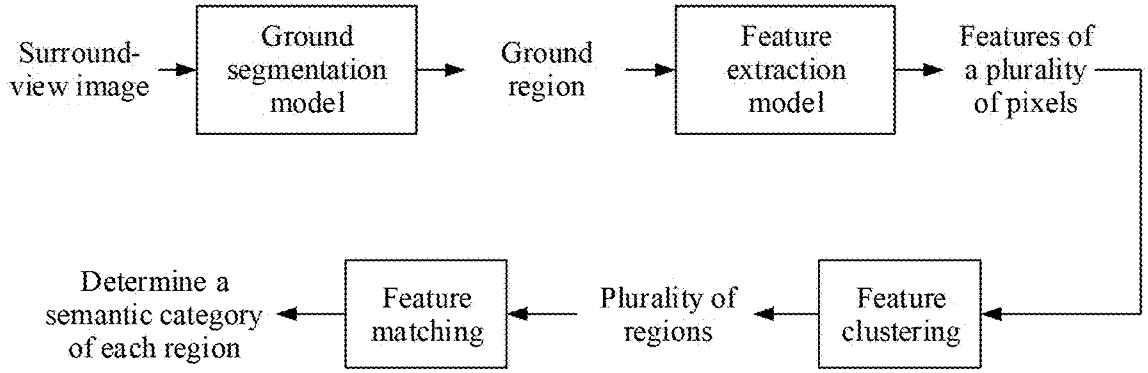
FIG. 9 is a flowchart of determining a semantic category of each region according to an embodiment of this application.

For example, refer to FIG. 9. FIG. 9 is a flowchart of determining a semantic category of each region according to an embodiment of this application. In FIG. 9, a surround-view image is used as an input of a ground segmentation model, to obtain a ground region output by the ground segmentation model. The ground region is used as an input of a feature extraction model, to obtain features of a plurality of pixels output by the feature extraction model. Feature clustering is performed on the plurality of pixels, to obtain a plurality of regions. A region feature corresponding to each of the plurality of regions is obtained, and feature matching is performed on a region feature corresponding to each of the plurality of regions and a stored region feature that includes a semantic category, to determine the semantic category of each of the plurality of regions.

Figure 10:
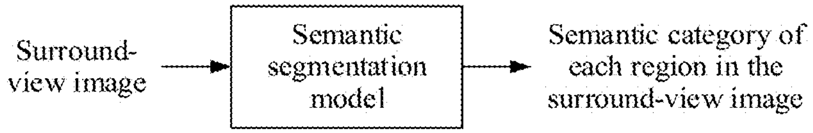
FIG. 10 is a flowchart of determining a semantic category of each region according to an embodiment of this application.

Certainly, that the semantic category of each region is determined is only an example. In actual application, the semantic category of each region may be determined in another manner. For example, refer to FIG. 10. A surround-view image is used as an input of a semantic segmentation model, to obtain a semantic category of each region in the surround-view image output by the semantic segmentation model. A region included in the surround-view image includes the plurality of regions obtained by dividing the ground region.

In an embodiment, an implementation process of determining a parking region from the plurality of regions based on region features and semantic categories of the plurality of regions, and determining an available parking space from a parking region based on parking information of the one or more parked vehicles includes: selecting, from the plurality of regions based on the semantic categories of the plurality of regions, a region whose semantic category is a road category but whose region feature is farthest from a region feature the road feature; and determining the available parking space in the selected region based on the parking information of the one or more parked vehicles, and if the available parking space in the selected region is sufficient for parking a target vehicle, determining the selected region as the parking region; or if the available parking space in the selected region is insufficient for parking a target vehicle, selecting, based on the semantic categories of the plurality of regions, a region whose region feature is farthest from the road feature from a remaining region whose semantic category is the road category, and returning to the operation of determining the available parking space in the selected region until the parking region sufficient for parking the target vehicle is determined. If there is no parking region sufficient for parking the target vehicle, prompt information is displayed. The prompt information is used to prompt the user to confirm a surrounding environment.

An implementation process of determining the available parking space from the parking region based on the parking information of the one or more parked vehicles includes: covering locations of the one or more parked vehicles in the parking region to obtain a first available parking region, detecting an obstacle in the first available parking region, and covering a region occupied by the obstacle in the first available parking region to obtain a second available parking region. A largest inscribed rectangle is extracted for the second available parking region to obtain a third available parking region, and a space in which the third available parking region is located as the available parking space.

In other words, the one or more parked vehicles are projected to the parking region based on the parking information of the one or more parked vehicles, and a projection region of the one or more parked vehicles in the parking region is covered, to obtain the first available parking region. The obstacle in the first available parking region is detected, the obstacle is projected to the first available parking region, and a projection region of the obstacle in the first available parking region, to obtain the second available parking region. Location information of each corner in the second available parking region is obtained, any four corners is divided into one group, to obtain a plurality of groups of corners. A quadrilateral area corresponding to each group of corners in the plurality of groups of corners is determined based on location information of each corner included in each group of corners in the plurality of groups of corners. A quadrilateral region with a largest area is selected as the third available parking region, to determine a space in which the third available parking region is located as the available parking space.

(3) Determine the target virtual parking slot based on the parking direction of the reference vehicle and the available parking space.

There are a plurality of manners of determining the target virtual parking slot based on the parking direction and the available parking space of the reference vehicle, and the following separately describes the manners.

In a first implementation, a plurality of candidate virtual parking slots are determined based on the parking direction of the reference vehicle and the available parking space, and the target virtual parking slot is determined from the plurality of candidate virtual parking slots in response to a second operation of the user.

In an example, the plurality of candidate virtual parking slots are determined based on the parking direction of the reference vehicle and the available parking space, and a fourth user interface is displayed. The fourth user interface includes the plurality of candidate virtual parking slots. The third user interface is displayed in response to the second operation of the user. The third user interface includes the target virtual parking slot.

In other words, after the plurality of candidate virtual parking slots are determined based on the parking direction of the reference vehicle and the available parking space, the fourth user interface is displayed. The user triggers the second operation in the fourth user interface, to determine the target virtual parking slot from the plurality of candidate virtual parking slots.

In some embodiments, the third user interface further displays an available parking space, and the target virtual parking slot is located in the available parking space.

An implementation process of determining the plurality of candidate virtual parking slots based on the parking direction of the reference vehicle and the available parking space includes: using the parking direction of the reference vehicle as a parking direction of the target vehicle, and determining the plurality of candidate virtual parking slots in the available parking space, so that a parking direction indicated by the plurality of candidate virtual parking slots is the parking direction of the target vehicle. In other words, the parking direction of the reference vehicle is directly used as the parking direction of the target vehicle, to determine the plurality of candidate virtual parking slots in the available parking space.

Certainly, the user may not be satisfied with the parking direction of the reference vehicle. Therefore, the electronic device displays the second user interface. The second user interface includes the reference vehicle. The second user interface can further indicate the parking direction of the reference vehicle, and use the parking direction of the reference vehicle as a reference parking direction. In this case, the third operation is used to adjust the reference parking direction in response to a third operation of the user, and an adjusted parking direction is determined as the parking direction of the target vehicle. The plurality of candidate virtual parking slots in the available parking space is determined based on the parking direction of the target vehicle, so that the parking direction indicated by the plurality of candidate virtual parking slots is the parking direction of the target vehicle.

There are a plurality of implementations of determining the plurality of candidate virtual parking slots in the available parking space. For example, the plurality of candidate virtual parking slots are arranged in parallel starting from a side that is in the available parking space and that is close to the reference vehicle. Alternatively, the plurality of candidate virtual parking slots are arranged in parallel from right to left in the available parking space. Alternatively, the plurality of candidate virtual parking slots are arranged in parallel from left to right in the available parking space.

The second operation of the user includes any one of a touch action, a tapping action, and a sliding action of the user on the fourth user interface. For example, the user determines the target virtual parking slot by touching the candidate virtual parking slot, or determines the target virtual parking slot by tapping the candidate virtual parking slot, or determines the target virtual parking slot by sliding the candidate virtual parking slot. This is not limited in an embodiment of the application. The third operation of the user includes any one of a click action or a drag action of the user on the second user interface. For example, the user adjusts the parking direction by clicking the candidate virtual parking slot, or adjusts the parking direction by dragging the candidate virtual parking slot. This is not limited in an embodiment of the application.

Figure 11:
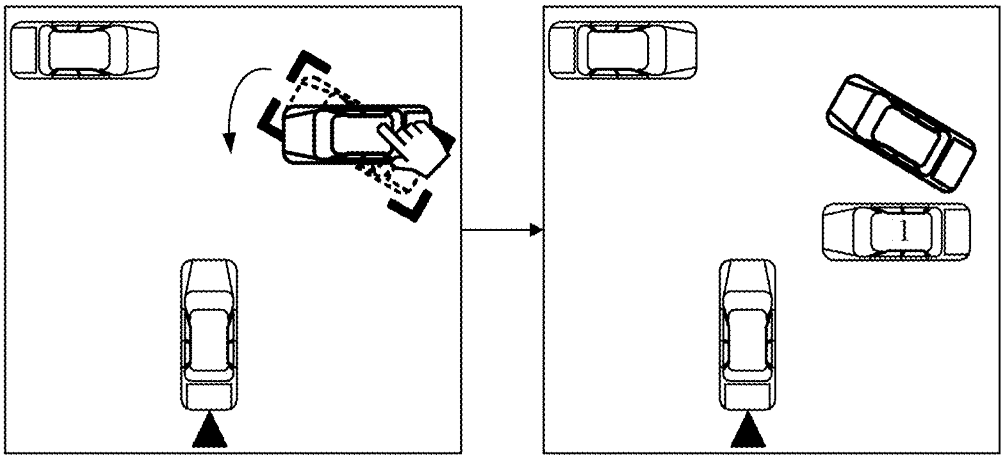
FIG. 11 is a schematic diagram of adjusting a parking direction by a user according to an embodiment of this application.

For example, a second user interface displayed by the electronic device is shown in the left figure in FIG. 11. The second user interface includes three vehicles: a target vehicle, a reference vehicle, and another parked vehicle. A triangle icon is displayed near a vehicle rear of the target vehicle, and “L”-shaped indication identifiers are displayed around the reference vehicle. In addition, the second user interface further includes a parking direction of the reference vehicle. When a user is not satisfied with the parking direction of the reference vehicle, the parking direction of the reference vehicle is used as a reference parking direction. The user can adjust the reference parking direction based on a direction of an arrow in the left figure in FIG. 11, and determine an adjusted parking direction as a parking direction of the target vehicle. Then, a plurality of candidate virtual parking slots are determined according to the foregoing method, and a parking direction of a target virtual parking slot (a virtual vehicle model with 1) selected from the plurality of candidate virtual parking slots is shown in the right figure in FIG. 11.

Figure 12:
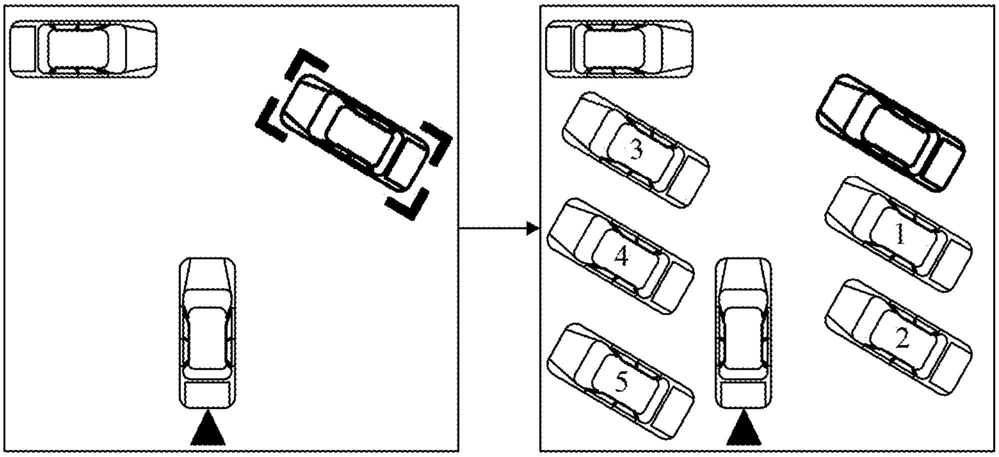
FIG. 12 is a schematic diagram of determining a plurality of candidate virtual parking slots according to an embodiment of this application.
Figure 13:
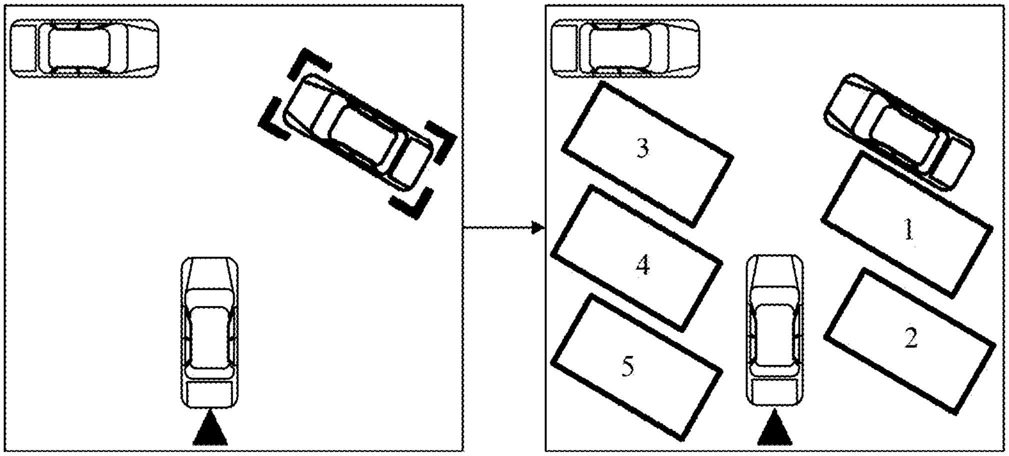
FIG. 13 is another schematic diagram of determining a plurality of candidate virtual parking slots according to an embodiment of this application.

After determining the parking direction of the target vehicle, the electronic device can determine the plurality of candidate virtual parking slots in a plurality of manners. As shown in FIG. 12 and FIG. 13, for example, the user is satisfied with parking directions of reference vehicles. Three vehicles: a target vehicle, a reference vehicle, and another parked vehicle are included in the left figure in FIG. 12. A triangle icon is displayed near a vehicle rear of the target vehicle, and “L”-shaped indication identifiers are displayed around the reference vehicle. Five virtual vehicle models are arranged in parallel starting from a side that is in an available parking space and that is close to the reference vehicle, and the five virtual vehicle models one-to-one correspond to five candidate virtual parking slots, in this way, the right figure in FIG. 12 is obtained. Alternatively, in FIG. 13, five candidate virtual parking slots (black rectangular frames) are arranged in parallel starting from the side that is in the available parking space and that is close to the reference vehicle.

Figure 14:
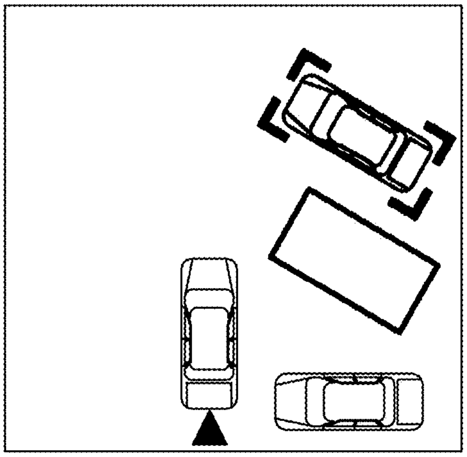
FIG. 14 is a schematic diagram of a target virtual parking slot determined based on a reference vehicle according to an embodiment of this application.
Figure 15:
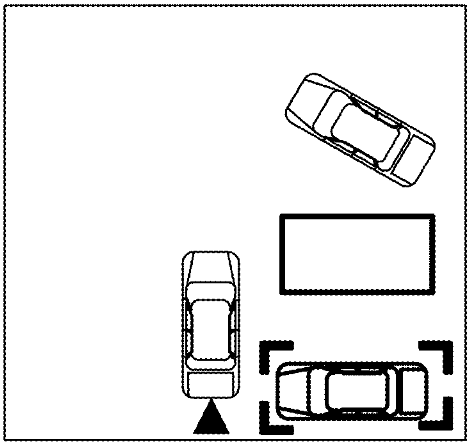
FIG. 15 is another schematic diagram of a target virtual parking slot determined based on a reference vehicle according to an embodiment of this application.

In an embodiment of the application, when a determined reference vehicle is different, a finally determined target virtual parking slot is also different. For example, as shown in FIG. 14, when the determined reference vehicle is a vehicle in an upper right corner (“L”-shaped indication identifiers are displayed around the vehicle), the finally determined target virtual parking slot (a black rectangular frame) is shown in FIG. 14. For another example, as shown in FIG. 15, when the determined reference vehicle is a vehicle in a lower right corner (“L”-shaped indication identifiers are displayed around the vehicle), the finally determined target virtual parking slot (a black rectangular frame) is shown in FIG. 15.

In an embodiment, when there are a plurality of parked vehicles around the target vehicle, the plurality of parked vehicles may be distributed on one side of a driving road of the target vehicle, or may be distributed on two sides of a driving road of the target vehicle. When the plurality of parked vehicles are distributed on two sides of the driving road of the target vehicle, a target virtual vehicle is determined based on parking information of reference vehicles on the two sides of the driving road of the target vehicle. In other words, one reference vehicle may be separately determined from the parked vehicles that are on the two sides of the driving road of the target vehicle according to the foregoing method. In this way, one parking space is separately determined from two sides of the driving road according to the foregoing method, and the plurality of candidate virtual parking slots are separately determined from the available parking space on the two sides of the driving road based on reference vehicles on the two sides of the driving road of the target vehicle, to determine the target virtual parking slot according to the foregoing method.

Figure 16:
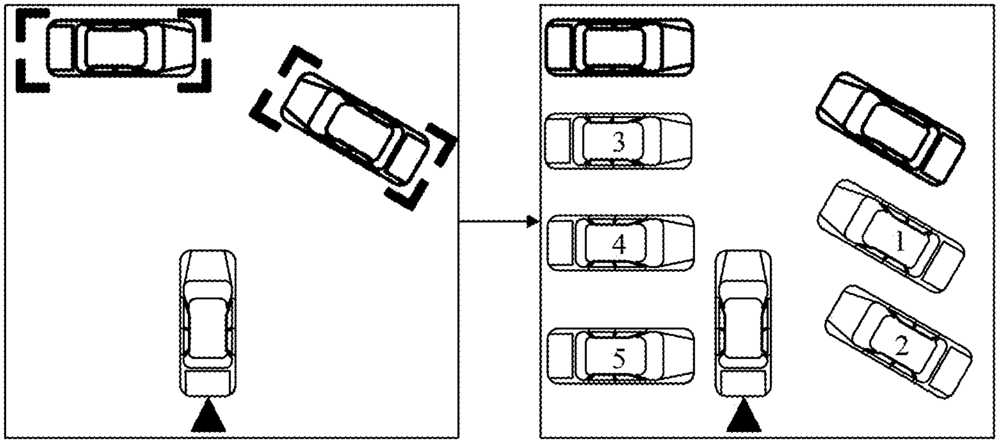
FIG. 16 is still another schematic diagram of determining a plurality of candidate virtual parking slots according to an embodiment of this application.
Figure 17:
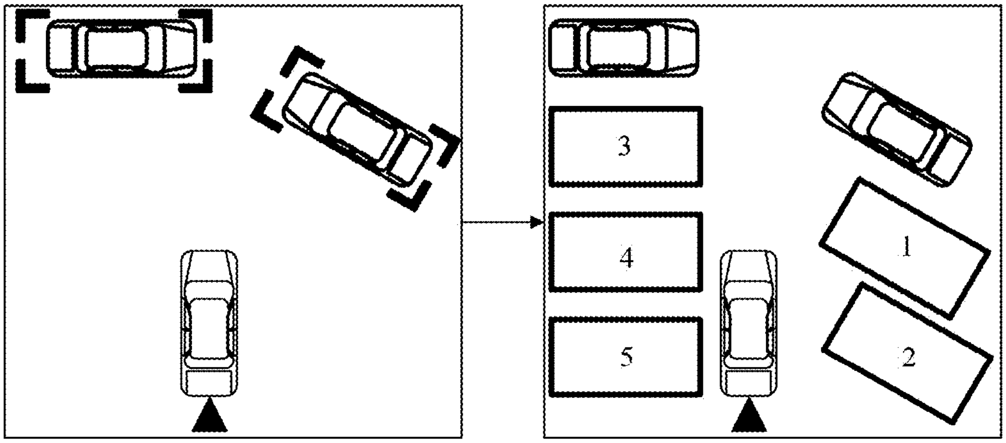
FIG. 17 is yet another schematic diagram of determining a plurality of candidate virtual parking slots according to an embodiment of this application.

For example, as shown in FIG. 16 and FIG. 17, a vehicle in the middle in the left figure in FIG. 16 is a target vehicle, and the other two vehicles are reference vehicles ("L"-shaped indication identifiers are displayed around the vehicle). The two reference vehicles are separately a reference vehicle on a left side of a driving road of the target vehicle and a reference vehicle on a right side of the driving road of the target vehicle. Two virtual vehicle models are arranged in parallel starting from a side that is in an available parking space on the right side of the driving road and that is close to the reference vehicle on the right side of the driving road. The two virtual vehicle models one-to-one correspond to two candidate virtual parking slots. Three virtual vehicle models are arranged in parallel starting from a side that is in an available parking space on the left side of the driving road and that is close to the reference vehicle on the left side of the driving road. The three virtual vehicle models one-to-one correspond to three candidate virtual parking slots, the five virtual vehicle models are shown in the right figure in FIG. 16. Alternatively, in FIG. 17, two candidate virtual parking slots (black rectangular frames) are arranged in parallel starting from a side that is in the available parking space on the right side of the driving road and that is close to the reference vehicle on the right side of the driving road, and three candidate virtual parking slots are arranged in parallel starting from a side that is in the available parking space on the left side of the driving road and that is close to the reference vehicle on the left side of the driving road.

Figure 18:
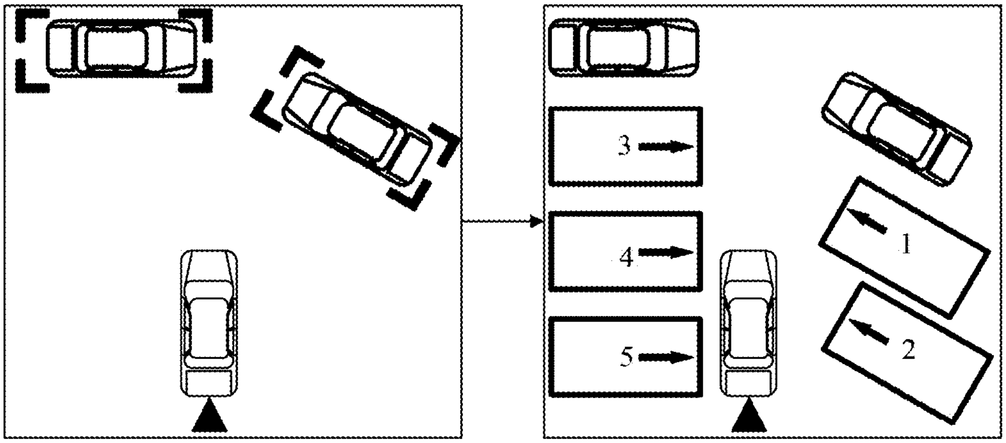
FIG. 18 is a schematic diagram of displaying a vehicle front orientation of a virtual parking slot according to an embodiment of this application.

In an embodiment, regardless of whether the plurality of candidate virtual parking slots are represented by using a plurality of virtual vehicle models, or the plurality of candidate virtual parking slots are represented by using the black rectangular frame or in another display manner, after the plurality of candidate virtual parking slots are determined, a vehicle front orientation corresponding to the plurality of candidate virtual parking slots may be displayed. For example, as shown in FIG. 18, an arrow is displayed in each candidate virtual parking slot, and the arrow is used to indicate a vehicle front orientation.

In a second implementation, the candidate virtual parking slot is determined based on the parking direction of the reference vehicle and the available parking space. If there is one candidate virtual parking slot, the candidate virtual parking slot is directly used as the target virtual parking slot. If there are a plurality of candidate virtual parking slots, one candidate virtual parking slot is selected from the plurality of candidate virtual parking slots as the target virtual parking slot.

For a manner of determining the candidate virtual parking slot based on the parking direction of the reference vehicle and the available parking space, refer to the foregoing first implementation. Details are not described herein again.

In addition, there are a plurality of implementations of selecting one candidate virtual parking slot from the plurality of candidate virtual parking slots as the target virtual parking slot. For example, one candidate virtual parking slot is selected from the plurality of candidate virtual parking slots as the target virtual parking slot and is recommended to the user. Alternatively, the plurality of candidate virtual parking slots are recommended to the user, and the user selects one candidate virtual parking slot as the target virtual parking slot. When one candidate virtual parking slot is selected from the plurality of candidate virtual parking slots as the target virtual parking slot and is recommended to the user, a candidate virtual parking slot that is closest to a current location of the target vehicle may be selected from the plurality of candidate virtual parking slots with reference to a distance between the current location of the target vehicle and the candidate virtual parking slot, and is recommended to the user as the target virtual parking slot. Certainly, one candidate virtual parking slot may be selected, in another manner, and recommended to the user.

In an example, after one candidate virtual parking slot is selected from the plurality of candidate virtual parking slots, a fifth user interface is displayed. The fifth user interface includes the recommended virtual parking slot. A third user interface is displayed in response to a fourth operation of the user. The fourth operation is used to indicate the user to confirm that the recommended virtual parking slot is used as the target virtual parking slot.

In another example, after one candidate virtual parking slot is selected from the plurality of candidate virtual parking slots, a fifth user interface is displayed. The fifth user interface includes the recommended virtual parking slot. A fourth user interface is displayed in response to a fifth operation of the user. The fourth user interface includes the plurality of candidate virtual parking slots, and the fifth operation is used to indicate that the user is not satisfied with the recommended parking location of the virtual parking slot. A third user interface is in response to a second operation of the user. The second operation is used to select a target virtual parking slot from the plurality of candidate virtual parking slots.

In other words, when one candidate virtual parking slot is selected from the plurality of candidate virtual parking slots and is recommended to the user as the target virtual parking slot, the user may directly accept the recommended virtual parking slot, that is, the recommended virtual parking slot is used as the target virtual parking slot. Certainly, the user may not be satisfied with the parking location of the recommended virtual parking slot. In this case, all the plurality of candidate virtual parking slots need to be recommended to the user, and the user selects one candidate virtual parking slot as the target virtual parking slot.

It should be noted that the fourth operation of the user includes either of a touch action or a tapping action of the user on the fifth user interface. For example, the fifth user interface includes an "OK" button, and the user determines the recommended virtual parking slot as the target virtual parking slot by touching the "OK" button. This is not limited in an embodiment of the application. The fifth operation of the user includes either of a touch action or a tapping action of the user on the fifth user interface. For example, the fifth user interface includes a "cancel" button, and the user touches the "cancel" button to indicate that the user is not satisfied with the currently recommended virtual parking slot. This is not limited in an embodiment of the application.

In an embodiment, when the user is not satisfied with the recommended virtual parking slot, the fourth user interface displayed by the electronic device further includes an icon indicating the recommended virtual parking slot.

Figure 19:
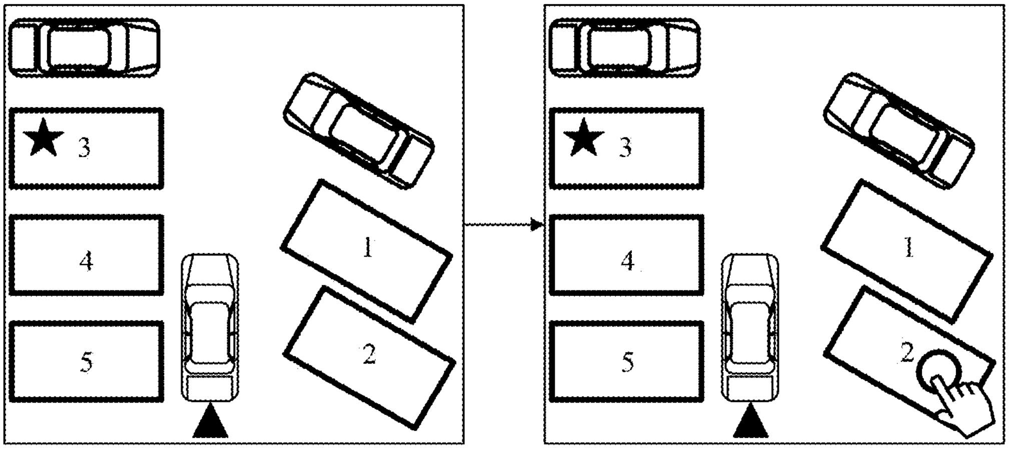
FIG. 19 is a schematic diagram of selecting a target virtual parking slot by a user according to an embodiment of this application.

For example, after the electronic device selects one candidate virtual parking slot from the plurality of candidate virtual parking slots as the target virtual parking slot and recommends the target virtual parking slot to the user, if the user is not satisfied with the recommended virtual parking slot, the electronic device may display the fourth user interface shown in the left figure in FIG. 19, and the recommended virtual parking slot is marked by using a pentagon icon on the fourth user interface. In this case, as shown in the right figure in FIG. 19, the user may reselect a candidate virtual parking slot from the fourth user interface as the target virtual parking slot.

In a third implementation, the second user interface further includes an available parking space. A sixth operation is used to select, in response to the sixth operation of the user, a location from the available parking space as the parking location of the target vehicle. The target virtual parking slot is determined based on the parking direction of the reference vehicle and the parking location of the target vehicle.

In other words, the user selects a location from the available parking space as the parking location of the target vehicle, and then determines the target virtual parking slot based on the parking direction of the reference vehicle and the parking location of the target vehicle.

The sixth operation of the user includes any one of a touch action, a tapping action, and a drag action of the user on the second user interface. For example, the user selects the parking location of the target vehicle by touching the electronic device in the available parking space of the second user interface, or the user selects the parking location of the target vehicle by tapping the electronic device in the available parking space of the second user interface, or the user selects the parking location of the target vehicle by dragging another marker on the second user interface. The marker is a reference vehicle, another vehicle, or the like.

When the target virtual parking slot is determined based on the parking direction of the reference vehicle and the parking location of the target vehicle, the parking direction of the reference vehicle may be directly used as the parking direction of the target vehicle, and the target virtual parking slot is determined at the parking location of the target vehicle in the available parking space, so that a parking direction indicated by the target virtual parking slot is the parking direction of the target vehicle. Certainly, the user may not be satisfied with the parking direction of the reference vehicle. Therefore, the electronic device displays the second user interface. The second user interface includes the reference vehicle. The second user interface can further indicate the parking direction of the reference vehicle, and use the parking direction of the reference vehicle as a reference parking direction. In this case, the third operation is used to adjust the reference parking direction in response to a third operation of the user, and an adjusted parking direction is determined as the parking direction of the target vehicle. The target virtual parking slot is determined at the parking location of the target vehicle in the available parking space based on the parking direction of the target vehicle, so that a parking direction indicated by the target virtual parking slot is the parking direction of the target vehicle.

Figure 20:
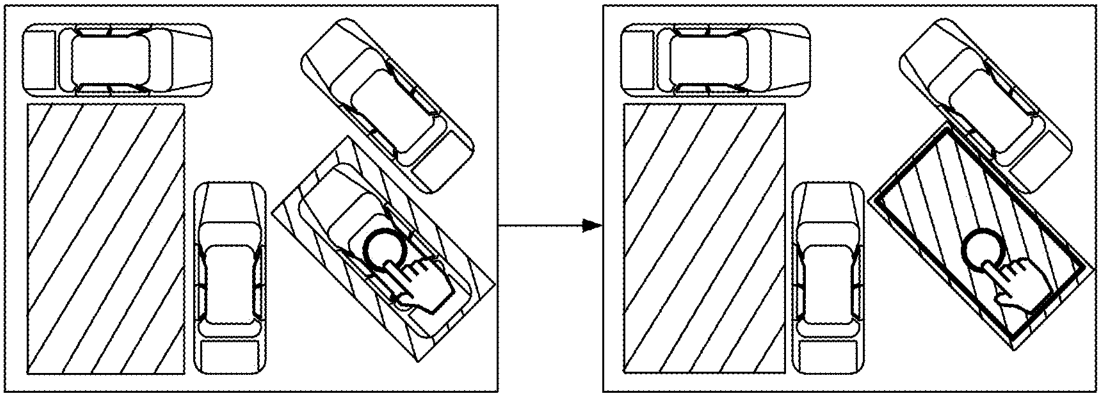
FIG. 20 is a schematic diagram of selecting a parking location of a target vehicle by a user according to an embodiment of this application.
Figure 21:
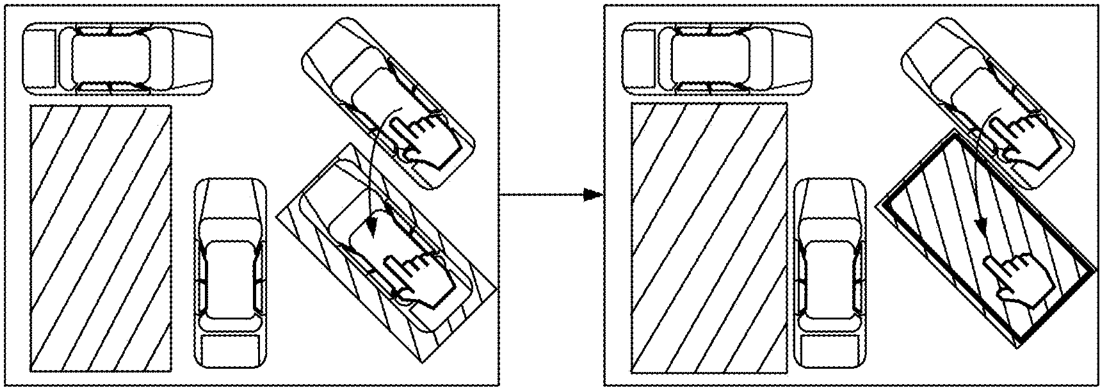
FIG. 21 is another schematic diagram of selecting a parking location of a target vehicle by a user according to an embodiment of this application.

For example, on the second user interface shown in FIG. 20, a shadow region in FIG. 20 represents the available parking space. In the left figure in FIG. 20, the user first taps the reference vehicle on the second user interface, and then taps the available parking space, so that the electronic device can display a parking location (a black rectangular frame in FIG. 20) of the target vehicle in the right figure in FIG. 20. Alternatively, on the second user interface shown in FIG. 21, a shadow region in FIG. 21 represents the available parking space. In the left diagram in FIG. 21, the user drags the reference vehicle to the available parking space, so that the electronic device can display a parking location (a black rectangular frame in FIG. 21) of the target vehicle in the right figure in FIG. 21.

The foregoing content is an implementation process of determining the target virtual parking slot when there is a parked vehicle around the target vehicle. In some cases, there may be no parked vehicle around the target vehicle. In this case, the electronic device performs three-dimensional space measurement on the available parking space, to determine a depth of the available parking space. Then, the parking direction of the target vehicle is determined based on a ratio of the depth of the available parking space to a vehicle body length of the target vehicle. In addition, the parking location of the target vehicle is determined in the available parking space, to determine the target virtual parking slot.

In an example, if the ratio of the depth of the available parking space to the vehicle body length of the target vehicle is greater than a first proportion threshold, it is determined that the vehicle body direction of the target vehicle relative to a road baseline is a vertical direction. If the ratio of the depth of the available parking space to the vehicle body length of the target vehicle is less than a second proportion threshold, it is determined that the vehicle body direction of the target vehicle relative to the road baseline is a horizontal direction. If the ratio of the depth of the available parking space to the vehicle body length of the target vehicle is less than the first proportion threshold but is greater than the second proportion threshold, it is determined that the vehicle body direction of the target vehicle relative to the road baseline is an oblique direction, where an oblique angle of the oblique direction is an arc sine value of the depth of the available parking space and the vehicle body length of the target vehicle.

It should be noted that the first proportion threshold and the second proportion threshold are preset, and can be adjusted based on different requirements. For example, the first proportion threshold is 0.9, and the second proportion threshold is 0.7.

In addition, when the parking location of the target vehicle is determined in the available parking space, reference may be made to the foregoing method, and the user selects a location in the available parking space as the parking location of the target vehicle. Certainly, the electronic device may also determine a plurality of candidate virtual parking slots in the available parking space based on the parking direction of the target vehicle with reference to the foregoing method, and the user selects one candidate virtual parking slot as the target virtual parking slot. For a manner in which the user selects a location from the available parking space as the parking location of the target vehicle, and a manner in which the user selects a candidate virtual parking slot from a plurality of candidate virtual parking slots as the target virtual parking slot, refer to the foregoing descriptions. Details are not described herein again.

In an embodiment of the application, one vehicle is selected from the one or more parked vehicles around the target vehicle as the reference vehicle, and the target virtual parking slot is determined based on the parking direction of the reference vehicle. This can ensure that the target vehicle and the selected reference vehicle are arranged in a consistent manner after automatic parking is performed in the virtual parking slot, and improves parking neatness and convenience. In addition, the attribute information of the plurality of key points and the plurality of key lines of the first vehicle is detected. In this way, the parking direction of the first vehicle can be accurately obtained. In addition, after the ground region is segmented by using the ground segmentation model, a plurality of regions can be determined through feature clustering of pixels included in the ground region, and an uncommon parking region can be determined based on semantic categories of the plurality of regions. This improves parking region recognition effect.

Figure 22:
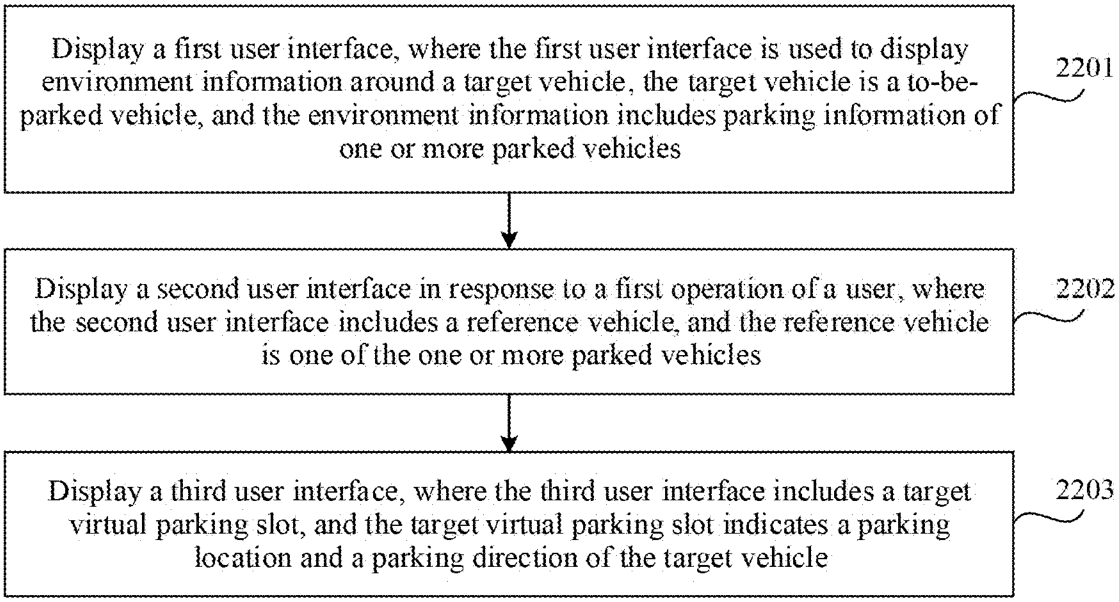
FIG. 22 is a flowchart of a display method for assisted parking according to an embodiment of this application.

FIG. 22 is a flowchart of a display method for assisted parking according to an embodiment of this application. The method is applied to the foregoing electronic device. Refer to FIG. 22. The method includes the following operations.

Operation 2201: Display a first user interface, where the first user interface is used to display environment information around a target vehicle, the target vehicle is a to-be-parked vehicle, and the environment information around the target vehicle includes parking information of one or more parked vehicles.

In some embodiments, the first user interface includes one or more operation identifiers, and the one or more operation identifiers one-to-one correspond to the one or more parked vehicles.

The environment information displayed on the first user interface is image information obtained by a camera or radar. Alternatively, the environment information displayed on the first user interface is virtual environment information generated based on information obtained by a sensor.

For related content of operation 2201, refer to related descriptions in operation 202. Details are not described herein again.

Operation 2202: Display a second user interface in response to a first operation of a user, where the second user interface includes a reference vehicle, and the reference vehicle is one of the one or more parked vehicles.

The first operation of the user includes any one of a touch action, a tapping action, and a sliding action of the user on the first user interface.

In some embodiments, the second user interface further includes a second vehicle, and the second vehicle is any vehicle other than the reference vehicle in the one or more parked vehicles; and a display manner of the reference vehicle is different from that of the second vehicle. For example, a display color of the reference vehicle is different from that of the second vehicle, or a contour line of the reference vehicle is different from that of the second vehicle, or a background texture of the reference vehicle is different from that of the second vehicle.

It should be noted that the second user interface further includes an indication identifier, and the indication identifier indicates the reference vehicle.

For related content of operation 2202, refer to related descriptions in operation 202. Details are not described herein again.

Operation 2203: Display a third user interface, where the third user interface includes a target virtual parking slot, and the target virtual parking slot indicates a parking location and a parking direction of the target vehicle.

In some embodiments, a fourth user interface is displayed, where the fourth user interface includes a plurality of candidate virtual parking slots. The third user interface is displayed in response to a second operation of the user. The target virtual parking slot is one of the plurality of candidate virtual parking slots.

In some embodiments, the third user interface further includes an icon indicating the target vehicle.

In some embodiments, the third user interface further displays an available parking space, and the target virtual parking slot is located in the available parking space.

For related content of operation 2203, refer to related descriptions in operation 203. Details are not described herein again.

In an embodiment of the application, the environment information around the target vehicle is displayed, so that the user determines the reference vehicle by operating a virtual vehicle model or an operation identifier, and determines the target virtual parking slot by using parking information of the reference vehicle. This can ensure that the target vehicle and the reference vehicle are arranged in a consistent manner after automatic parking is performed in the virtual parking slot. In addition, if a plurality of candidate virtual parking slots are generated, the plurality of candidate virtual parking slots can be displayed, so that the user selects a satisfied target virtual parking slot. This meets a personalized requirement of the user.

Figure 23:
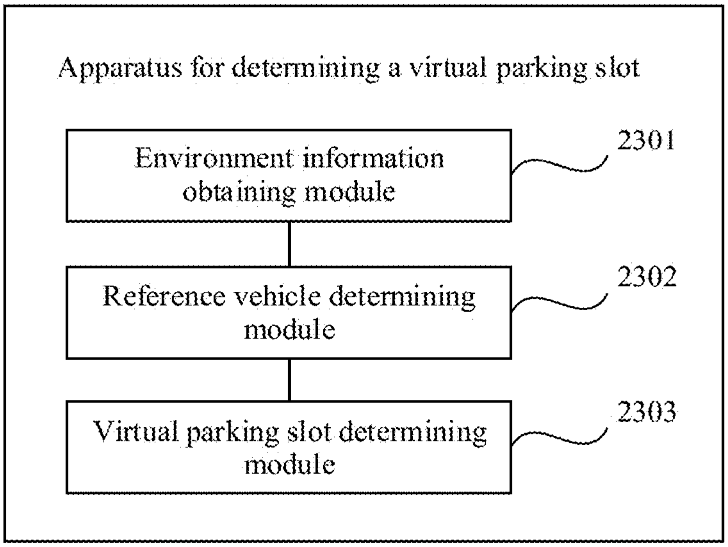
FIG. 23 is a block diagram of an apparatus for determining a virtual parking slot according to an embodiment of this application.

FIG. 23 is a schematic diagram of a structure of an apparatus for determining a virtual parking slot according to an embodiment of this application. The apparatus may be implemented as a part or all of an electronic device by using software, hardware, or a combination thereof. The electronic device may be the electronic device shown in FIG. 1. Refer FIG. 23. The apparatus includes an environment information obtaining module 2301, a reference vehicle determining module 2302, and a virtual parking slot determining module 2303.

The environment information obtaining module 2301 is configured to obtain environment information around a target vehicle, where the target vehicle is a to-be-parked vehicle, and the environment information includes parking information of one or more parked vehicles.

The reference vehicle determining module 2302 is configured to determine a reference vehicle based on the parking information of the one or more parked vehicles, where the reference vehicle is one of the one or more parked vehicles.

The virtual parking slot determining module 2303 is configured to determine a target virtual parking slot based on parking information of the reference vehicle, where the target virtual parking slot indicates a parking location and a parking direction of the target vehicle.

In an embodiment, the reference vehicle determining module 2302 includes:

- a first interface display submodule, configured to display a first user interface, where the first user interface includes parking locations and parking directions of the one or more parked vehicles, and the parking locations and the parking directions of the one or more parked vehicles are determined based on the parking information of the one or more parked vehicles; and
- a second interface display submodule, configured to display a second user interface in response to a first operation of a user, where the second user interface includes the reference vehicle, and the first operation indicates to select the reference vehicle from the one or more parked vehicles.

In an embodiment, the reference vehicle determining module 2302 includes:

a parking information determining submodule, configured to determine parking locations and parking directions of the one or more parked vehicles based on the parking information of the one or more parked vehicles; and a reference vehicle determining submodule, configured to determine, based on the parking locations and the parking directions of the one or more parked vehicles, the reference vehicle by using a preset model.

In an embodiment, the virtual parking slot determining module 2303 includes:

a parking direction determining submodule, configured to determine a parking direction of the reference vehicle based on the parking information of the reference vehicle;

a parking space determining submodule, configured to determine an available parking space based on the parking information of the one or more parked vehicles; and a virtual parking slot determining submodule, configured to determine the target virtual parking slot based on the parking direction of the reference vehicle and the available parking space.

In an embodiment, the virtual parking slot determining submodule is configured to:

determine a plurality of candidate virtual parking slots based on the parking direction of the reference vehicle and the available parking space; and determine the target virtual parking slot from the plurality of candidate virtual parking slots in response to a second operation of the user.

In an embodiment, for a first vehicle in the one or more parked vehicles, the first vehicle is any one of the one or more parked vehicles, and the parking information determining submodule is configured to:

input parking information of the first vehicle into a key information detection model, to determine attribute information of a plurality of key points of the first vehicle and attribute information of a plurality of key lines of the first vehicle; and input the attribute information of the plurality of key points of the first vehicle and the attribute information of the plurality of key lines of the first vehicle into a pose estimation model, to determine a parking direction of the first vehicle.

In an embodiment, the attribute information of the key point includes at least one of a key point location, a key point category, and key point visibility, and the key point visibility indicates whether a corresponding key point is blocked; and the attribute information of the key line includes at least one of a key line central point location, key line visibility, a key line inclination, and a key line length, and the key line visibility indicates whether a corresponding key line is blocked.

In an embodiment, the information about the environment information around the target vehicle includes at least one of visual data and radar data.

In an embodiment, the parking direction of the target vehicle includes a vehicle front orientation and a vehicle body direction of the target vehicle, and the vehicle body direction of the target vehicle is a direction of a vehicle body of the target vehicle relative to a vehicle body of the reference vehicle.

In an embodiment, the vehicle body direction of the target vehicle includes that the vehicle body of the target vehicle is parallel to, vertical to, and inclined to that of the reference vehicle.

In an embodiment, the environment information includes the parking information of the plurality of parked vehicles, the plurality of parked vehicles are distributed on two sides of a driving road of the target vehicle, and the target virtual parking slot is determined based on the parking information of the reference vehicle on the two sides of the driving road.

In an embodiment of the application, one vehicle is selected from the one or more parked vehicles around the target vehicle as the reference vehicle, and the target virtual parking slot is determined based on the parking direction of the reference vehicle. This can ensure that the target vehicle and the selected reference vehicle are arranged in a consistent manner after automatic parking is performed in the virtual parking slot, and improves parking neatness and convenience. In addition, the attribute information of the plurality of key points and the plurality of key lines of the first vehicle is detected. In this way, the parking direction of the first vehicle can be accurately obtained. In addition, after the ground region is segmented by using the ground segmentation model, a plurality of regions can be determined through feature clustering of pixels included in the ground region, and an uncommon parking region can be determined based on semantic categories of the plurality of regions. This improves parking region recognition effect.

It needs to be noted that, when the apparatus for determining a virtual parking slot provided in the foregoing embodiment determines the virtual parking slot, division of the foregoing function modules is only used as an example for description. In an actual application, the foregoing functions may be allocated to different function modules based on a requirement, that is, an internal structure of the apparatus is divided into different function modules to complete all or some of the functions described above. In addition, the apparatus for determining the virtual parking slot provided in the foregoing embodiments belongs to a same concept as the embodiment of the method for determining the virtual parking slot. For an implementation process, refer to the method embodiments. Details are not described herein again.

Figure 24:
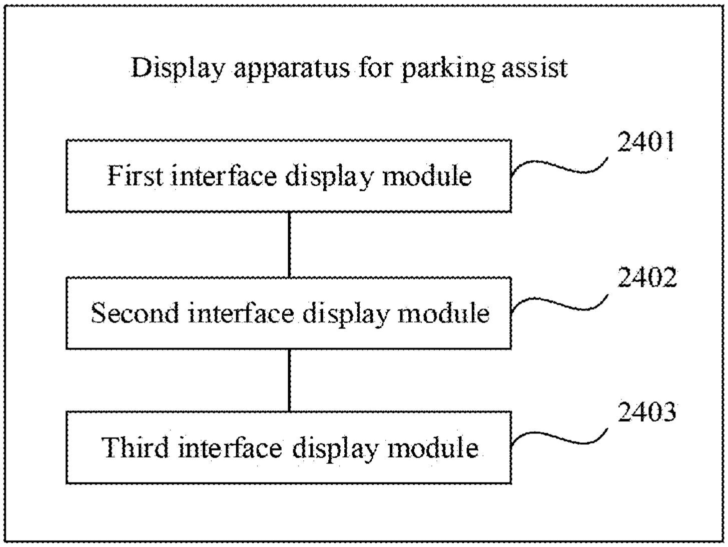
FIG. 24 is a block diagram of a display apparatus for assisted parking according to an embodiment of this application.

FIG. 24 is a schematic diagram of a structure of a display apparatus for assisted parking according to an embodiment of this application. The apparatus may be implemented as a part or all of an electronic device by using software, hardware, or a combination thereof. The electronic device may be the electronic device shown in FIG. 1. Refer to FIG. 24. The apparatus includes a first interface display module 2401, a second interface display module 2402, and a third interface display module 2403.

The first interface display module 2401 is configured to display a first user interface, where the first user interface is used to display environment information around a target vehicle, the target vehicle is a to-be-parked vehicle, and the environment information includes parking information of one or more parked vehicles.

The second interface display module 2402 is configured to display a second user interface in response to a first operation of a user, where the second user interface includes a reference vehicle, and the reference vehicle is one of the one or more parked vehicles.

The third interface display module 2403 is configured to display a third user interface, where the third user interface includes a target virtual parking slot, and the target virtual parking slot indicates a parking location and a parking direction of the target vehicle.

In an embodiment, the second user interface further includes a second vehicle, and the second vehicle is any vehicle other than the reference vehicle in the one or more parked vehicles.

A display manner of the reference vehicle is different from that of the second vehicle.

In an embodiment, the second user interface further includes an indication identifier, and the indication identifier indicates the reference vehicle.

In an embodiment, the third interface display module is configured to:

display a fourth user interface, where the fourth user interface includes a plurality of candidate virtual parking slots; and display the third user interface in response to a second operation of the user, where the target virtual parking slot is one of the plurality of candidate virtual parking slots.

In an embodiment, the third user interface further displays an available parking space, and the target virtual parking slot is located in the available parking space.

In an embodiment, the first user interface includes one or more operation identifiers, and the one or more operation identifiers one-to-one correspond to the one or more parked vehicles.

In an embodiment, the environment information displayed on the first user interface is image information obtained by a camera or radar.

In an embodiment, the environment information displayed on the first user interface is virtual environment information generated based on information obtained by a sensor.

In an embodiment, the third user interface further includes an icon indicating the target vehicle.

In an embodiment, the first operation of the user includes any one of a touch action, a tapping action, and a sliding action of the user on the first user interface.

In an embodiment of the application, the environment information around the target vehicle is displayed, so that the user determines the reference vehicle by operating a virtual vehicle model or an operation identifier, and determines the target virtual parking slot by using parking information of the reference vehicle. This can ensure that the target vehicle and the reference vehicle are arranged in a consistent manner after automatic parking is performed in the virtual parking slot. In addition, if a plurality of candidate virtual parking slots are generated, the plurality of candidate virtual parking slots can be displayed, so that the user selects a satisfied target virtual parking slot. This meets a personalized requirement of the user.

Figure 25:
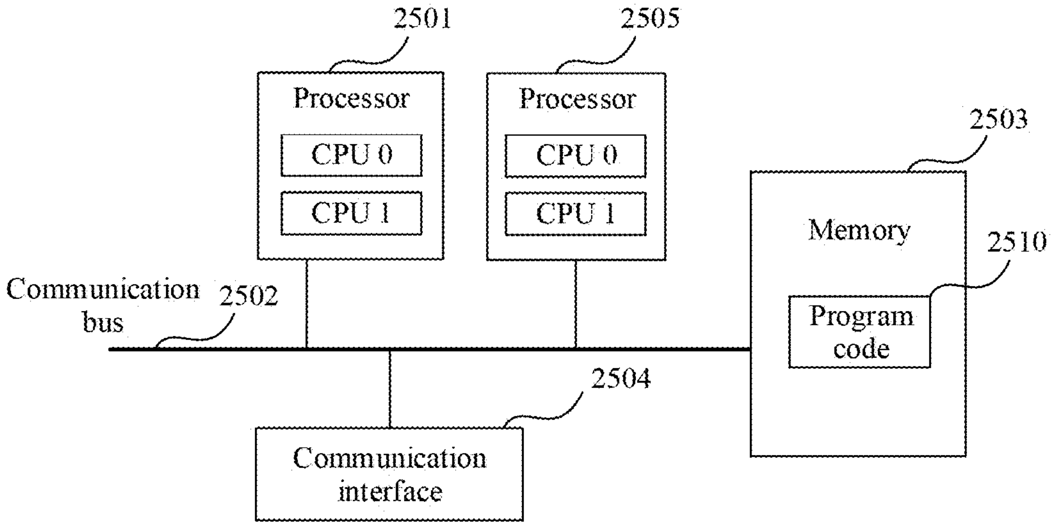
FIG. 25 is a schematic diagram of a structure of an electronic device according to an embodiment of this application.

FIG. 25 is a schematic diagram of a structure of an electronic device according to an embodiment of this application. The electronic device may be the electronic device 101 shown in FIG. 1. The electronic device includes at least one processor 2501, a communication bus 2502, a memory 2503, and at least one communication interface 2504.

The processor 2501 may be a general-purpose central processing unit (CPU), a network processor (NP), a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The communication bus 2502 is configured to transmit information between the foregoing components. The communication bus 2502 may be classified into an address bus, a data bus, a control bus, or the like. For ease of representation, only one thick line is used to represent the bus in the figure, but this does not mean that there is only one bus or only one type of bus.

The memory 2503 may be a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be used to carry or store expected program code in a form of instructions or a data structure and that is accessible to a computer. However, this is not limited hereto. The memory 2503 may exist independently, and is connected to the processor 2501 through the communication bus 2502. The memory 2503 may alternatively be integrated with the processor 2501.

The communication interface 2504 is configured to communicate with another device or a communication network by using any apparatus such as a transceiver. The communication interface 2504 includes a wired communication interface, or may include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, or a combination thereof.

In an embodiment, the processor 2501 may include one or more CPUs, such as a CPU 0 and a CPU 1 in FIG. 25.

In an embodiment, the electronic device may include a plurality of processors, for example, the processor 2501 and a processor 2505 shown in FIG. 25. Each of the processors may be a single-core processor, or may be a multi-core processor. The processor herein may be one or more devices, circuits, and/or processing cores configured to process data (for example, computer program instructions).

In an embodiment, the electronic device may further include an output device 2506 and an input device 2507. The output device 2506 communicates with the processor 2501, and may display information in a plurality of manners. For example, the output device 2506 may be a liquid crystal display (LCD), a light emitting diode (LED) display device, a cathode ray tube (CRT) display device, or a projector. The input device 2507 communicates with the processor 2501, and may receive an input of a user in a plurality of manners. For example, the input device 2507 may be a mouse, a keyboard, a touchscreen device, or a sensing device.

In some embodiments, the memory 2503 is configured to store program code 2510 for performing the solutions of this application, and the processor 2501 may execute the program code 2510 stored in the memory 2503. The program code 2510 may include one or more software modules. The electronic device may implement the method provided in the foregoing embodiment by using the processor 2501 and the program code 2510 in the memory 2503.

Figure 26:
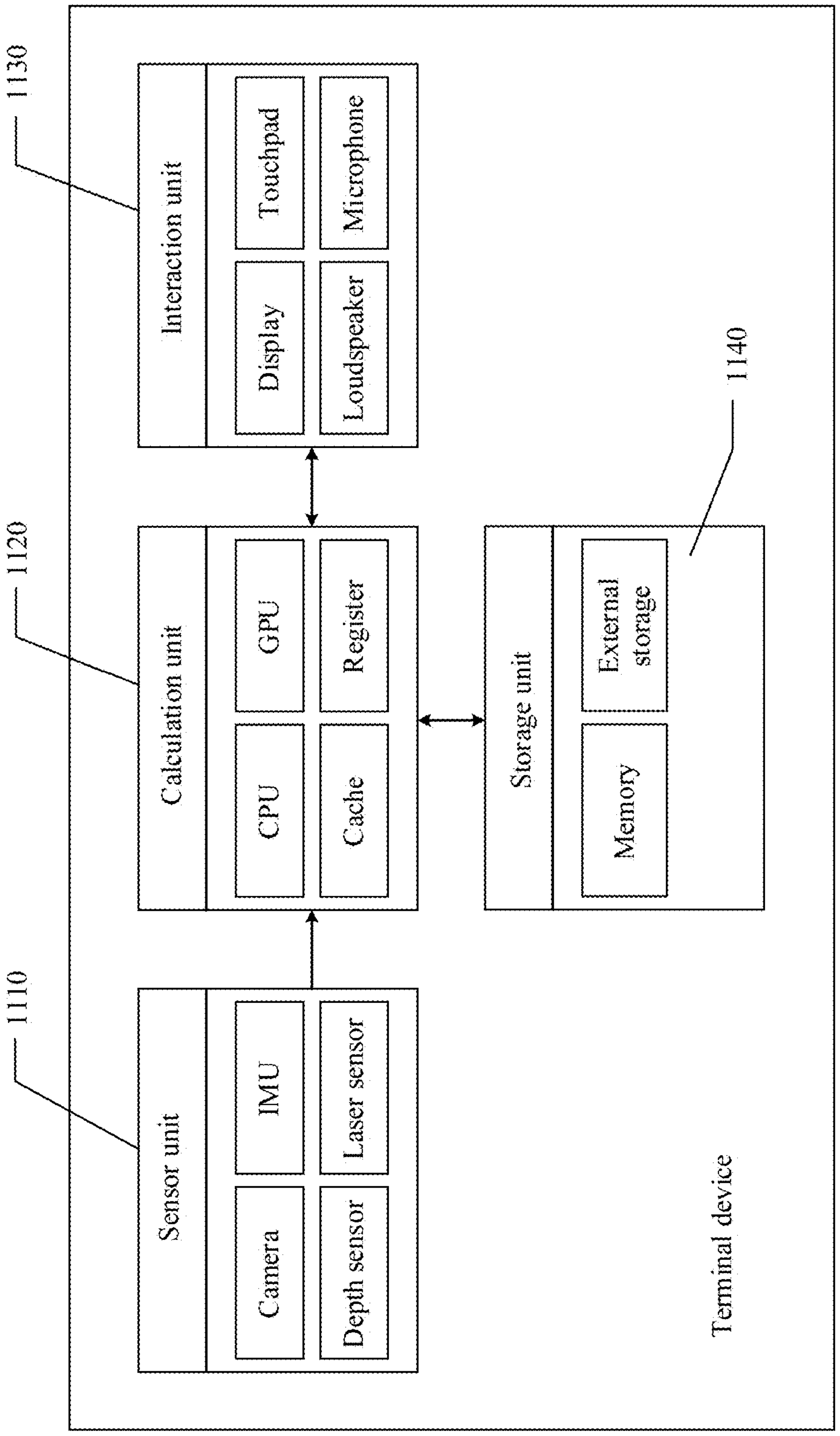
FIG. 26 is a schematic diagram of a structure of a terminal device according to an embodiment of this application.

FIG. 26 is a schematic diagram of a structure of a terminal device according to an embodiment of this application. The terminal device may be the foregoing electronic device. The terminal device includes a sensor unit 1110, a calculation unit 1120, a storage unit 1140, and an interaction unit 1130.

The sensor unit 1110 usually includes a visual sensor (such as a camera), a depth sensor, an IMU, a laser sensor, and the like.

The calculation unit 1120 usually includes a CPU, a GPU, a cache, a register, and the like, and is mainly configured to run an operating system.

The storage unit 1140 mainly includes a memory and an external storage, and is mainly configured to read and write local and temporary data of a user.

The interaction unit 1130 mainly includes a display, a touchpad, a loudspeaker, a microphone, and the like, and is mainly configured to interact with a user, obtain an input, implement presentation algorithm effect, and the like. For example, an amblyopia training image can be displayed and projected to an amblyopia training device.

Figure 27:
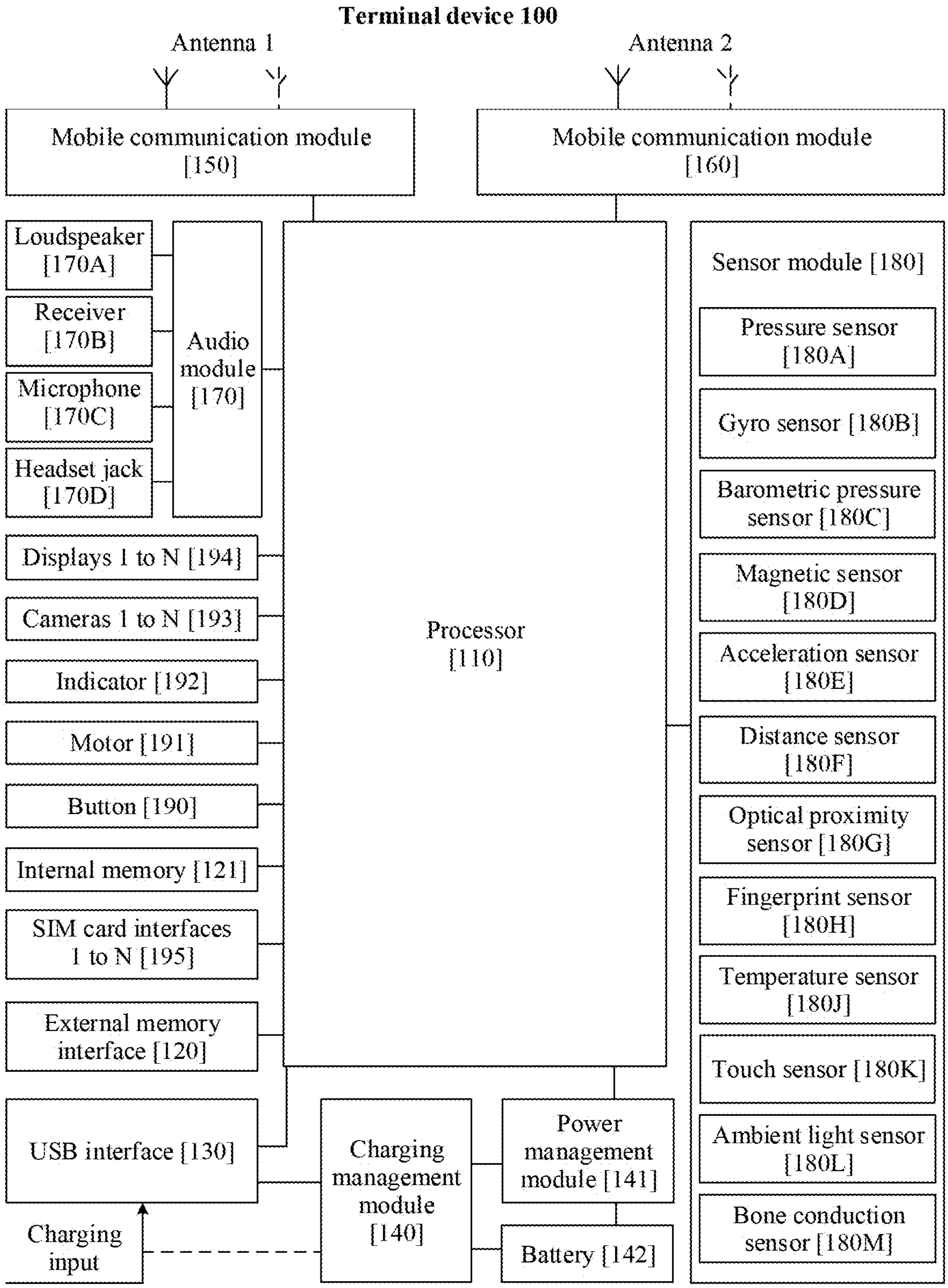
FIG. 27 is a schematic diagram of a structure of another terminal device according to an embodiment of this application.

For ease of understanding, the following describes, by using an example, a structure of a terminal device 100 provided in an embodiment of this application. FIG. 27 is a schematic diagram of a structure of a terminal device according to an embodiment of this application.

As shown in FIG. 27, the terminal device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and the like.

It can be understood that the structure illustrated in an embodiment of the application does not constitute a limitation on the terminal device 100. In some other embodiments of this application, the terminal device 100 may include more or fewer parts than those shown in the figure, or combine some parts, or split some parts, or have different part arrangements. The parts shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The processor 110 may execute a computer program, to implement any amblyopia training method in embodiments of this application.

The controller may be a nerve center and a command center of the terminal device 100. The controller may generate an operation control signal based on instruction operation code and a time sequence signal, to complete control of instruction fetching and instruction execution.

A memory may be disposed in the processor 110, and is configured to store instructions and data. In some embodiments, the memory in the processor 110 is a cache. The memory may store instructions or data used or cyclically used by the processor 110. If the processor 110 needs to use the instructions or the data again, the processor 110 may directly invoke the instructions or the data from the memory, to avoid repeated access and reduce waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It can be understood that an interface connection relationship between the modules illustrated in an embodiment of the application is only an example for description, and does not constitute a limitation on the structure of the terminal device 100. In some other embodiments of this application, the terminal device 100 may alternatively use different interface connection manners in the foregoing embodiments or a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like.

A wireless communication function of the terminal device 100 may be implemented through the antenna 1, the antenna 2, the mobile communication module 150, the wireless communication module 160, the modem processor, the baseband processor, and the like.

In an embodiment, the terminal device 100 may communicate with another device by using a wireless communication function. For example, the terminal device 100 may communicate with a second electronic device, the terminal device 100 establishes a projection connection to the second electronic device, and the terminal device 100 outputs projection data to the second electronic device. The projection data output by the terminal device 100 may be audio/video data.

The antenna 1 and the antenna 2 are configured to transmit and receive an electromagnetic wave signal. Each antenna in the terminal device 100 can be configured to cover one or more communication frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a wireless communication solution that is applied to the terminal device 100 and that includes wireless communication such as 1G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 2. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a solution that includes wireless communication such as a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology and that is applied to the terminal device 100. The wireless communication module 160 may be one or more components integrating at least one communication processor module. The wireless communication module 160 receives an electromagnetic wave through the antenna 1, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal device 100 is coupled to the mobile communication module 150, and the antenna 2 is coupled to the wireless communication module 160, so that the terminal device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 100 implements a display function by using a GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal device 100 may include one or N displays 194, where N is a positive integer greater than 1.

In an embodiment, the display 194 may be configured to display interfaces for output by a system of the terminal device 100.

The terminal device 100 may implement a shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device 100 may include one or N cameras 193, where N is a positive integer greater than 1.

The digital signal processor is configured to process a digital signal, and may process another digital signal in addition to the digital image signal.

The video codec is configured to compress or decompress a digital video. The terminal device 100 may support one or more types of video codecs. In this way, the terminal device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the terminal device

100, for example, image recognition, facial recognition, voice recognition, and text understanding, can be implemented by using the NPU.

The external memory interface 120 may be configured to connect to an external memory card, for example, a micro SD card, to extend a storage capability of the terminal device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the terminal device 100. The internal memory 121 may include a program storage area and a data storage area. The program storage area may store an operating system, an application program required by at least one function (for example, an indoor positioning method in an embodiment of the application), and the like. The data storage area may store data (for example, audio data or a phone book) created in a process of using the terminal device 100. In addition, the internal memory 121 may include a high-speed random access memory, or may include a nonvolatile memory, for example, at least one magnetic disk storage device, a flash memory, or a universal flash storage (UFS).

The terminal device 100 may implement an audio function, for example, music playing and recording, through the audio module 170, the speaker 170A, the receiver 170B, the microphone 170C, the headset jack 170D, the application processor, and the like. In an embodiment, the audio module 170 may be configured to play a sound corresponding to a video. For example, when the display 194 displays a video play picture, the audio module 170 outputs a video play sound.

The audio module 170 is configured to convert digital audio information into an analog audio signal for output, and is also configured to convert analog audio input into a digital audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. The gyro sensor 180B may be configured to determine a motion posture of the terminal device 100. The barometric pressure sensor 180C is configured to measure barometric pressure.

The acceleration sensor 180E may detect magnitudes of accelerations of the terminal device 100 in various directions (usually on three axes or six axes). A magnitude and a direction of gravity may be detected when the terminal device 100 is stationary. The acceleration sensor 180E may be configured to identify a posture of the terminal device, and is used in an application such as switching between a landscape mode and a portrait mode or a pedometer.

The distance sensor 180F is configured to measure a distance.

The ambient light sensor 180L is configured to sense ambient light brightness.

The fingerprint sensor 180H is configured to collect a fingerprint.

The temperature sensor 180J is configured to detect a temperature.

The touch sensor 180K is also referred to as a touch panel. The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal device 100 at a location different from a location of the display 194.

The button 190 includes a power button, a volume button, and the like. The button 190 may be a mechanical button, or may be a touch button. The terminal device 100 may receive a button input, and generate a button signal input related to a user setting and function control of the terminal device 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like. It should be noted that, the computer-readable storage medium mentioned in an embodiment of the application may be a non-volatile storage medium, or in other words, may be a non-transitory storage medium.

It should be understood that "a plurality of" in this specification means two or more. In the descriptions of embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. One of ordinary skilled in the art may understand that the terms such as "first" and "second" do not limit a quantity or an execution sequence, and the terms such as "first" and "second" do not indicate a definite difference.

It should be noted that, information (including but not limited to user equipment information and user personal information), data (including but not limited to data used for analysis, stored data, and displayed data), and signals involved in embodiments of this application are authorized by the user or fully authorized by all parties, and collection, use, and processing of related data need to comply with related laws, regulations, and standards of related countries and regions. For example, the environment information around the target vehicle in embodiments of this application is obtained with sufficient authorization.

The foregoing descriptions are embodiments of this application, but are not intended to limit this application. Any modification, equivalent replacement, or improvement made without departing from the spirit and principle of this application should fall within the protection scope of this application.

What is claimed is:

1. A method for determining a virtual parking slot, comprising:

obtaining environment information around a target vehicle to be parked, wherein the environment information comprises parking information of one or more parked vehicles;

determining a reference vehicle based on the parking information of the one or more parked vehicles and a first operation of a user that indicates to select the reference vehicle from the one or more parked vehicles, wherein the reference vehicle is one of the one or more parked vehicles and the first operation of the user is received via a first user interface displayed by the target vehicle;

determining a target virtual parking slot based on parking information of the reference vehicle, wherein the target virtual parking slot indicates a parking location and a parking direction of the target vehicle; and configuring the target vehicle to automatically park based on the target virtual parking slot.

2. The method according to claim 1, wherein the determining the reference vehicle based on the parking information of the one or more parked vehicles comprises:

displaying the first user interface comprising parking locations and parking directions of the one or more parked vehicles, wherein the parking locations and the parking directions of the one or more parked vehicles are determined based on the parking information of the one or more parked vehicles; and displaying a second user interface in response to the first operation of the user, wherein the second user interface comprises the reference vehicle.

3. The method according to claim 1, wherein the determining the reference vehicle based on the parking information of the one or more parked vehicles comprises:

determining parking locations and parking directions of the one or more parked vehicles based on the parking information of the one or more parked vehicles; and determining, based on the parking locations and the parking directions of the one or more parked vehicles, the reference vehicle by using a preset model.

4. The method according to claim 1, wherein the determining the target virtual parking slot based on parking information of the reference vehicle comprises:

determining a parking direction of the reference vehicle based on the parking information of the reference vehicle;

determining an available parking space based on the parking information of the one or more parked vehicles; and determining the target virtual parking slot based on the parking direction of the reference vehicle and the available parking space.

5. The method according to claim 4, wherein the determining the target virtual parking slot based on the parking direction of the reference vehicle and the available parking space comprises:

determining a plurality of candidate virtual parking slots based on the parking direction of the reference vehicle and the available parking space; and determining the target virtual parking slot from the plurality of candidate virtual parking slots in response to a second operation of the user.

6. The method according to claim 2, wherein for a first vehicle in the one or more parked vehicles, the first vehicle is any one of the one or more parked vehicles, and the determining the parking direction of the first vehicle based on the parking information of the first vehicle comprises:

inputting the parking information of the first vehicle into a key information detection model, to determine attribute information of a plurality of key points of the first vehicle and attribute information of a plurality of key lines of the first vehicle; and inputting the attribute information of the plurality of key points of the first vehicle and the attribute information of the plurality of key lines into a pose estimation model, to determine the parking direction of the first vehicle.

7. The method according to claim 6, wherein the attribute information of the key point comprises at least one of a key point location, a key point category, or key point visibility, wherein the key point visibility indicates whether a corresponding key point is blocked; and the attribute information of the key line comprises at least one of a key line central point location, key line visibility, a key line inclination, or a key line length, and wherein the key line visibility indicates whether a corresponding key line is blocked.

8. The method according to claim 1, wherein the environment information around the target vehicle comprises at least one of visual data and radar data.

9. The method according to claim 1, wherein the parking direction of the target vehicle comprises a vehicle front orientation and a vehicle body direction of the target vehicle, which is a direction of a vehicle body of the target vehicle relative to a vehicle body of the reference vehicle.

10. The method according to claim 9, wherein the vehicle body direction of the target vehicle comprises that the vehicle body of the target vehicle is parallel to, vertical to, and inclined to that of the reference vehicle.

11. A display method for assisted parking, comprising:

displaying a first user interface used to display environment information around a target vehicle to be parked, wherein the environment information comprises parking information of one or more parked vehicles;

displaying a second user interface in response to a first operation of a user, wherein the second user interface comprises a reference vehicle which is one of the one or more parked vehicles and the first operation of the user indicates to select the reference vehicle from the one or more parked vehicles;

displaying a third user interface comprising a target virtual parking slot indicating a parking location and a parking direction of the target vehicle; and configuring the target vehicle to automatically park based on the target virtual parking slot.

12. The method according to claim 11, wherein the second user interface further comprises a second vehicle, which is any vehicle other than the reference vehicle in the one or more parked vehicles; and a display manner of the reference vehicle is different from the second vehicle.

13. The method according to claim 11, wherein the second user interface further comprises an indication identifier indicating the reference vehicle.

14. The method according to claim 11, wherein the displaying the third user interface comprises:

displaying a fourth user interface comprising a plurality of candidate virtual parking slots; and displaying the third user interface in response to a second operation of the user, wherein the target virtual parking slot is one of the plurality of candidate virtual parking slots.

15. An electronic device, comprising:

a processor, and a memory coupled to the processor to store instructions, which when executed by the processor, cause the processor to:

collect environment information around a target vehicle to be parked, wherein the environment information comprises parking information of one or more parked vehicles;

determine a reference vehicle based on the parking information of the one or more parked vehicles and a first operation of a user that indicates to select the reference vehicle from the one or more parked vehicles, wherein the reference vehicle is one of the one or more parked vehicles and the first operation of the user is received via a first user interface displayed by the target vehicle;

determine a target virtual parking slot based on parking information of the reference vehicle, wherein the target virtual parking slot indicates a parking location and a parking direction of the target vehicle; and configure the target vehicle to automatically park based on the target virtual parking slot.

16. The electronic device according to claim 15, wherein to determine the reference vehicle based on the parking information of the one or more parked vehicles the processor is caused to:

display the first user interface comprising parking locations and parking directions of the one or more parked vehicles, and the parking locations and the parking directions of the one or more parked vehicles are determined based on the parking information of the one or more parked vehicles; and display a second user interface in response to the first operation of the user, wherein the second user interface comprises the reference vehicle.

17. The electronic device according to claim 15, wherein to determine the reference vehicle based on the parking information of the one or more parked vehicles the processor is caused to:

determining parking locations and parking directions of the one or more parked vehicles based on the parking information of the one or more parked vehicles; and determine, based on the parking locations and the parking directions of the one or more parked vehicles, the reference vehicle by using a preset model.

18. The electronic device according to claim 15, wherein to determine the target virtual parking slot based on parking information of the reference vehicle the processor is caused to:

determine a parking direction of the reference vehicle based on the parking information of the reference vehicle;

determine an available parking space based on the parking information of the one or more parked vehicles; and determine the target virtual parking slot based on the parking direction of the reference vehicle and the available parking space.

19. A non-transitory computer-readable storage medium having instructions stored therein, which when executed by a processor, cause the processor to:

collect environment information around a target vehicle to be parked, wherein the environment information comprises parking information of one or more parked vehicles;

determine a reference vehicle based on the parking information of the one or more parked vehicles and a first operation of a user that indicates to select the reference vehicle from the one or more parked vehicles, wherein the reference vehicle is one of the one or more parked vehicles and the first operation of the user is received via a first user interface displayed by the target vehicle;

determine a target virtual parking slot based on parking information of the reference vehicle, wherein the target virtual parking slot indicates a parking location and a parking direction of the target vehicle; and configure the target vehicle to automatically park based on the target virtual parking slot.

20. The non-transitory computer-readable storage medium of claim 19, wherein to determine the reference vehicle based on the parking information of the one or more parked vehicles the processor is caused to:

display a first user interface comprising parking locations and parking directions of the one or more parked vehicles, wherein the parking locations and the parking directions of the one or more parked vehicles are determined based on the parking information of the one or more parked vehicles; and display a second user interface in response to the first operation of the user, wherein the second user interface comprises the reference vehicle.

* * * * *